US007395152B2

(12) United States Patent
Watanabe et al.

(10) Patent No.: US 7,395,152 B2
(45) Date of Patent: Jul. 1, 2008

(54) NAVIGATION SYSTEM AND PROGRAM

(75) Inventors: Yoshinori Watanabe, Chita-gun (JP); Masatoshi Abo, Toyota (JP); Kiyotaka Taguchi, Kariya (JP); Hidehiko Kawakami, Nagoya (JP); Hirokazu Shibata, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/396,712

(22) Filed: Apr. 4, 2006

(65) Prior Publication Data
US 2006/0271284 A1 Nov. 30, 2006

(30) Foreign Application Priority Data
Apr. 6, 2005 (JP) ............................. 2005-110089
Feb. 14, 2006 (JP) ............................. 2006-037270

(51) Int. Cl.
*G01C 21/30* (2006.01)
(52) U.S. Cl. ...................................... 701/209; 701/211
(58) Field of Classification Search ................ 701/209, 701/211, 212, 25
See application file for complete search history.

(56) References Cited

U.S. PATENT DOCUMENTS

| 5,323,321 | A | * | 6/1994 | Smith, Jr. ..................... 701/211 |
| 5,874,905 | A | * | 2/1999 | Nanba et al. ............. 340/995.2 |
| 6,636,806 | B1 | | 10/2003 | Irie |
| 7,089,110 | B2 | * | 8/2006 | Pechatnikov et al. ........ 701/210 |
| 2003/0050756 | A1 | * | 3/2003 | McGovern .................. 701/211 |
| 2004/0083056 | A1 | * | 4/2004 | Kim .......................... 701/211 |
| 2004/0162672 | A1 | * | 8/2004 | Kim .......................... 701/209 |
| 2005/0033511 | A1 | * | 2/2005 | Pechatnikov et al. ........ 701/210 |
| 2005/0102099 | A1 | * | 5/2005 | Linn .......................... 701/209 |

FOREIGN PATENT DOCUMENTS

| DE | 19-947-506 | 5/2001 |
| JP | A-7-272198 | 10/1995 |
| JP | A-9-81895 | 3/1997 |
| JP | A-9-105642 | 4/1997 |
| JP | A-10-30935 | 2/1998 |
| JP | A-2000-161968 | 6/2000 |
| JP | A-2002-213987 | 7/2002 |
| JP | A-2004-85329 | 3/2004 |

* cited by examiner

*Primary Examiner*—Mark Hellner
(74) *Attorney, Agent, or Firm*—Posz Law Group, PLC

(57) ABSTRACT

A map image showing a current position and its surroundings, a route, and an arrow are displayed and superimposed on one another. The arrow has a base indicating the current position and a length indicating a predetermined distance along the route. The arrow has the transparency adjusted to be half transparent to make the map image and route discernible. The arrow moves along with the current position as a vehicle travels on the route. When the route is rectilinear, the shape and length of the arrow do not change. When the route is turned left at an intersection, the arrowhead is turned left after reaching the intersection. Since the arrow is displayed along the route, the arrowhead is disposed on a road to which the vehicle is brought by a left turn made on a road on which the base is disposed.

23 Claims, 22 Drawing Sheets

FIG. 5

| | METHOD | L (EXAMPLE) |
|---|---|---|
| EX. 1 | ACCORDING TO AUDIO GUIDE | L=700m (AUDIO GUIDE IS GIVEN 700m IN ADVANCE "TURN TO THE LEFT AT THE NEXT INTERSECTION") |
| EX. 2 | ·ARROWHEAD REACHES INTERSECTION BEFORE AUDIO GUIDE ·AT AUDIO GUIDE, TURN DIRECTION IS INDICATED | L=800m |
| EX. 3 | ACCORDING TO SCALE, LENGTH OF ARROW IS CHANGED | 100m SCALE L=600m 200m SCALE L=1200m 400m SCALE L=2400m |
| EX. 4 | COMBINATION OF ABOVE | 100m SCALE L=800m 200m SCALE L=800m 400m SCALE L=2400m |

FIG. 6A

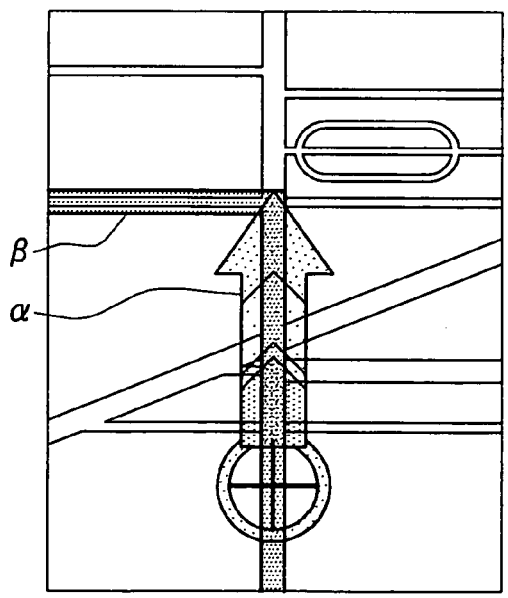

FIG. 6B

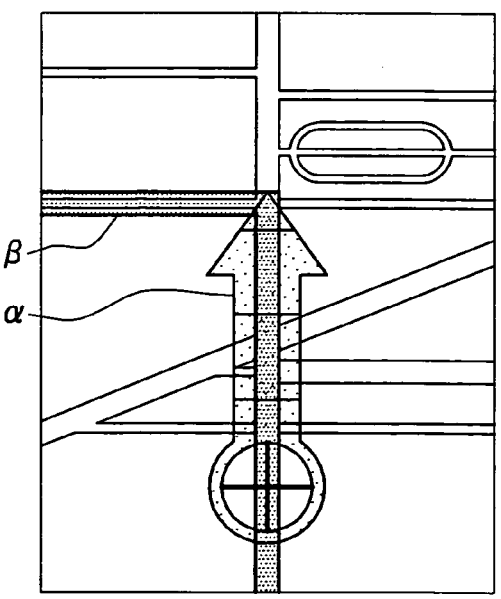

L=700m

L=800m

CURVE WARNING

JUNCTION WARNING

DESTINATION

TOLL GATE

MARK INDICATING LEFT TURN

MARK INDICATING LEFT TURN

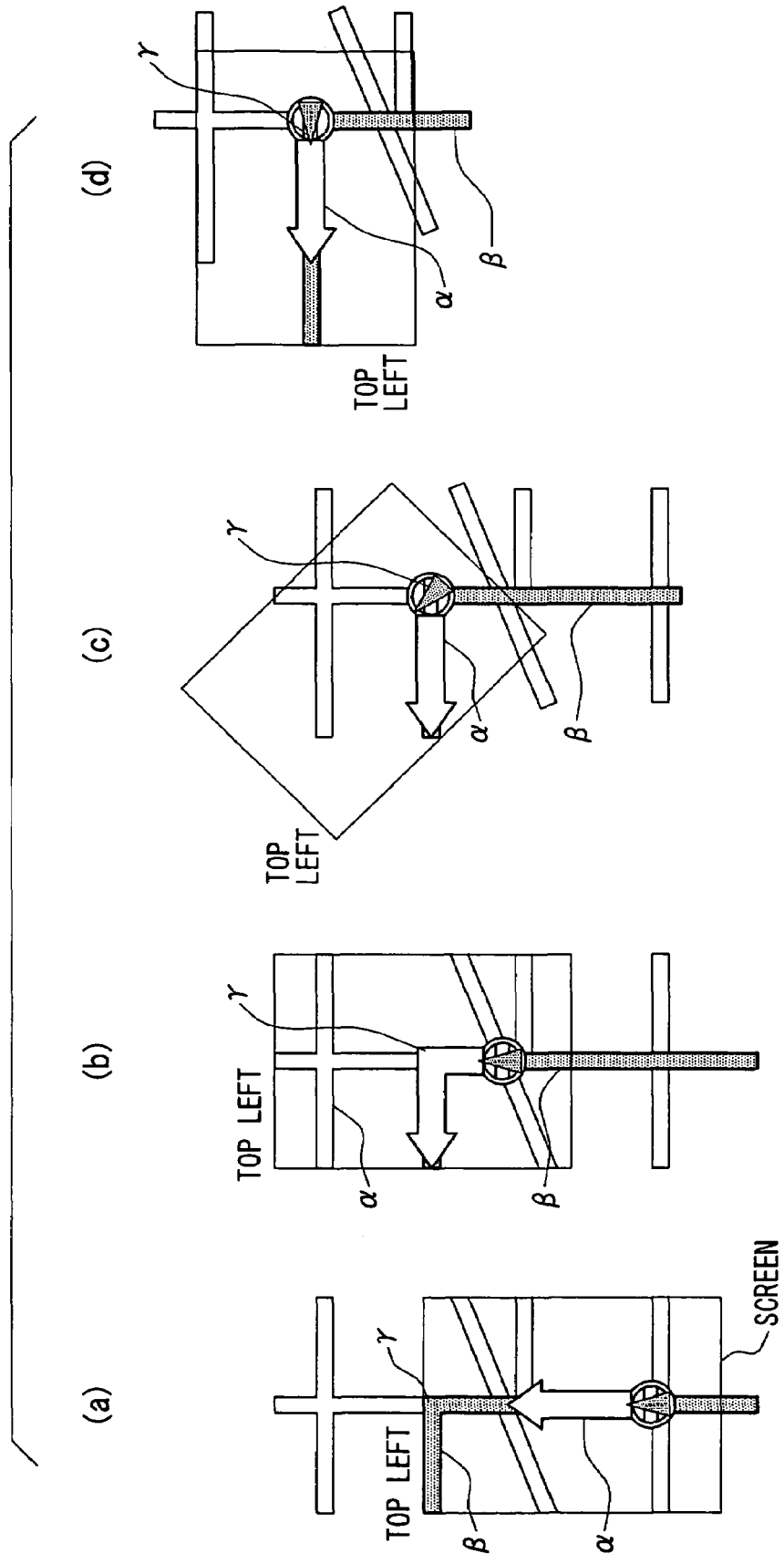

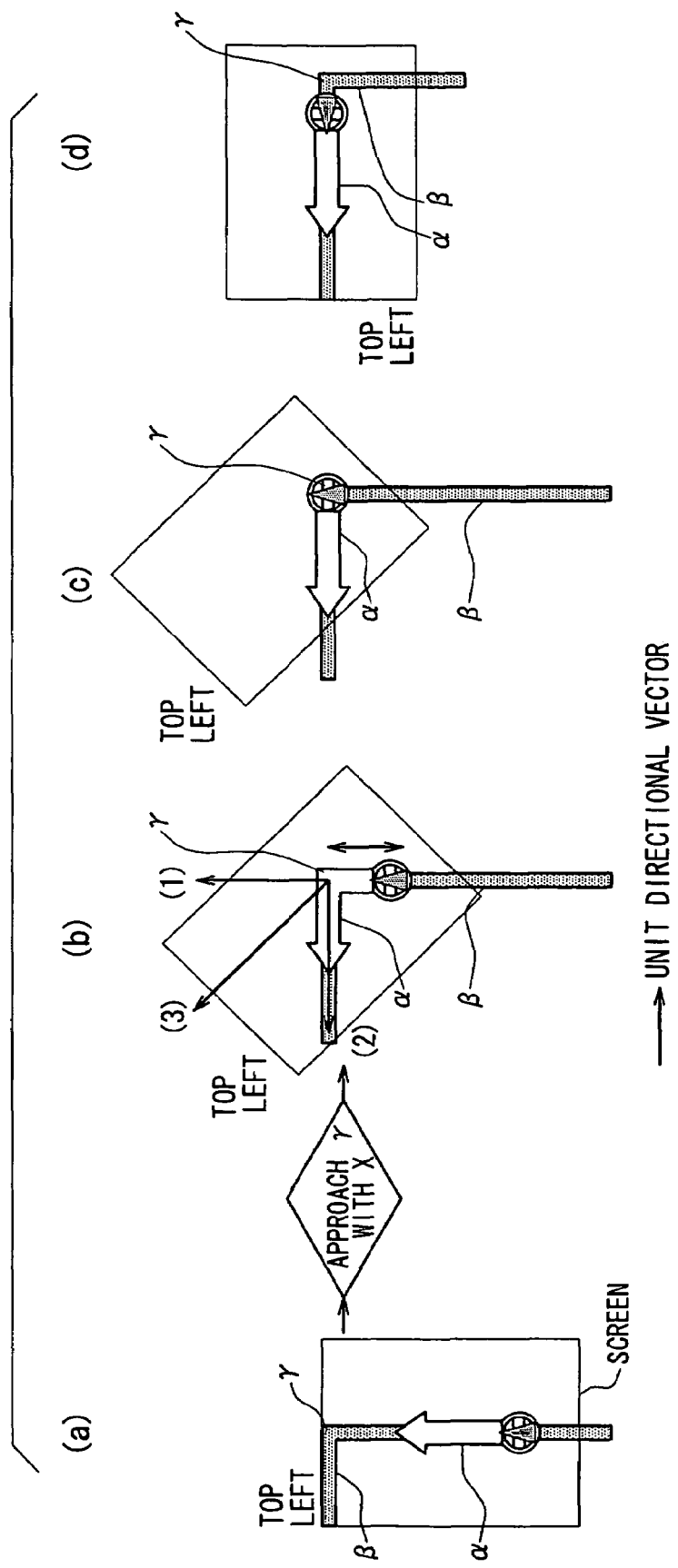

NAVIGATION SYSTEM AND PROGRAM

CROSS REFERENCE TO RELATED APPLICATIONS

This application is based on and incorporates herein by reference Japanese Patent Applications No. 2005-110089 filed on Apr. 6, 2005, and No. 2006-37270 filed on Feb. 14, 2006.

FIELD OF THE INVENTION

The present invention relates to a navigation system that is mounted in a vehicle in order to present a route to a destination by displaying an image.

BACKGROUND OF THE INVENTION

A navigation system uses a known technology of synthesizing a map image, which shows a current position and its surroundings, with a route to a destination, and displaying the synthetic image. A route line is superimposed on the map image with the color or thickness thereof changed, whereby the route is presented to a user. Otherwise, at an intersection or a branching point, an arrow indicating an advancing direction is displayed. These ideas have been proposed in the past. The arrow indicating the advancing direction is known to occupy part of a screen image so as to provide the contents described below.

(1) A distance from a current position to the next guide point to be presented and a direction in which a turn is made to reach the next guide point are displayed all the time (refer to FIG. 24A and FIG. 2 in Patent Document 1).

(2) When an intersection or any other guide point approaches, an enlarged view of the intersection is displayed in order to clarify a place where a turn is made (refer to FIG. 24B and FIG. 2 in Patent Document 1).

(3) A three-dimensional image showing an intersection or an entrance of an expressway in enlargement is displayed, and an advancing direction is indicated with an arrow (refer to FIG. 24C and FIG. 1 in Patent Document 2).

This navigation system may employ a large sideways elongated display whose diagonal has 6.5 inches or more. In this case, a portion of the screen of the display on which a current position mark is displayed and the other portion thereof on which information on a branch is displayed are, as shown in FIG. 24A, a bit separated from each other. A line of vision need be moved and the portions cannot be discerned at a time. When the portions are displayed as two screen images as shown in FIG. 24B and FIG. 24C, the current position is identified from the left-hand map image, and an advancing direction is recognized from the right-hand enlarged view. Anyhow, both the screen images must be checked.

For example, when a compact display whose diagonal has 6 inches or less or a display to be placed lengthwise is employed, there is difficulty in occupying part of the screen for the purpose of displaying a direction. When images are displayed as shown in FIG. 24B and FIG. 24C, the contents of display get complicated and the images become too small to see readily. Consequently, the technique of displaying two screen images cannot be adopted.

Patent Document 1: JP-H9-81895A

Patent Document 2: JP-H9-105642A

SUMMARY OF THE INVENTION

The present invention addresses the foregoing problems. An object of the present invention is to provide a navigation system making it possible to identify a current position and the direction of a route without the necessity of moving a line of vision.

A navigation system for use in a vehicle intended to solve the aforesaid problems is provided as described below. The navigation system includes the following: a guide unit including a display on which at least an image is displayed; a map data acquisition unit that acquires map data; a current position identification unit that identifies a current position of a vehicle; a route obtaining unit that obtains a route to a destination; and a guide control unit that uses the map data acquired by the map data acquisition unit to display on the display a map image which shows the current position identified by the current position identification unit and its surroundings, and that displays the route, which is recognized by the route obtaining unit, while superimposing the route on the map image. Here, the guide control unit displays an arrow, which includes (i) a base that indicates the current position identified by the current position identification unit, (ii) an arrowhead that points out a forward position separated by a predetermined distance along the route, and (iii) a segment leading to the arrowhead, while superimposing the arrow on the map image on which the route is superimposed.

Since the base of the displayed arrow indicates the current position, the current position can be checked. Moreover, since the arrow has the arrowhead that points out a forward position separated by the predetermined distance along the route, the direction of the route can be checked based on the entire arrow including the arrowhead. In other words, the current position and the direction of the route can be checked without the necessity of moving a line of vision.

Moreover, the technique of displaying two screen images, that is, an enlarged view (three-dimensional image) to be used to present a direction and a map image like the ones shown in FIG. 24B or FIG. 24C is hard to apply to a system that is supposed to display an image on a small screen or a lengthwise long screen. Supposing the technique were applied to the system by any means, visibility would be impaired. In the present invention, since the map image and a direction guide can be displayed on one screen, no problem will occur even when the present invention is applied to the system that is supposed to display an image on a small screen or a lengthwise long screen.

The arrow includes a base that indicates a current position, and an arrowhead that points out a forward position separated by a predetermined distance along the route. A user who sees the arrow would readily grasp a sense of a distance. For example, when the predetermined distance is set to 700 m (which means a distance indicated on a map but does not mean the length of the arrow), supposing the arrow is disposed at an intersection at which a vehicle should be turned to the right or left (see, for example, (b) in FIG. 2, the distance from the current position to the intersection is seen to be 700 m. Furthermore, assuming that the vehicle is approaching an intersection (see, for example, (c) in FIG. 2), when the user knows that the length of the arrow (α) indicates 700 m, the user can grasp an approximate distance from the current position to the intersection. For example, in the state shown in (c) in FIG. 2, since approximately three-sevenths of the arrow (α) from the head thereof overpasses the intersection, the user can grasp that the distance from the current position to the intersection is approximately 400 m. The reason why these results are obtained lies in that the arrow employed in the present invention moves along with the shift of a current position derived from driving of a vehicle. The technological idea of displaying the arrow is an unprecedented art.

BRIEF DESCRIPTION OF THE DRAWINGS

The above and other objects, features, and advantages of the present invention will become more apparent from the following detailed description made with reference to the accompanying drawings. In the drawings:

FIG. 5 is an explanatory diagram concerning the basic rules for display of the arrow α;

FIG. 6A and FIG. 6B are explanatory diagrams showing ideas devised for displaying the arrow α (coloring and graduation);

FIG. 16 includes explanatory diagrams showing in what direction on a screen the arrow α should be oriented;

FIG. 19 includes explanatory diagrams showing in what direction on a screen the arrow α should be oriented;

DETAILED DESCRIPTION OF THE PREFERRED EMBODIMENTS (Configuration of a Navigation System 20)

Figure 1:
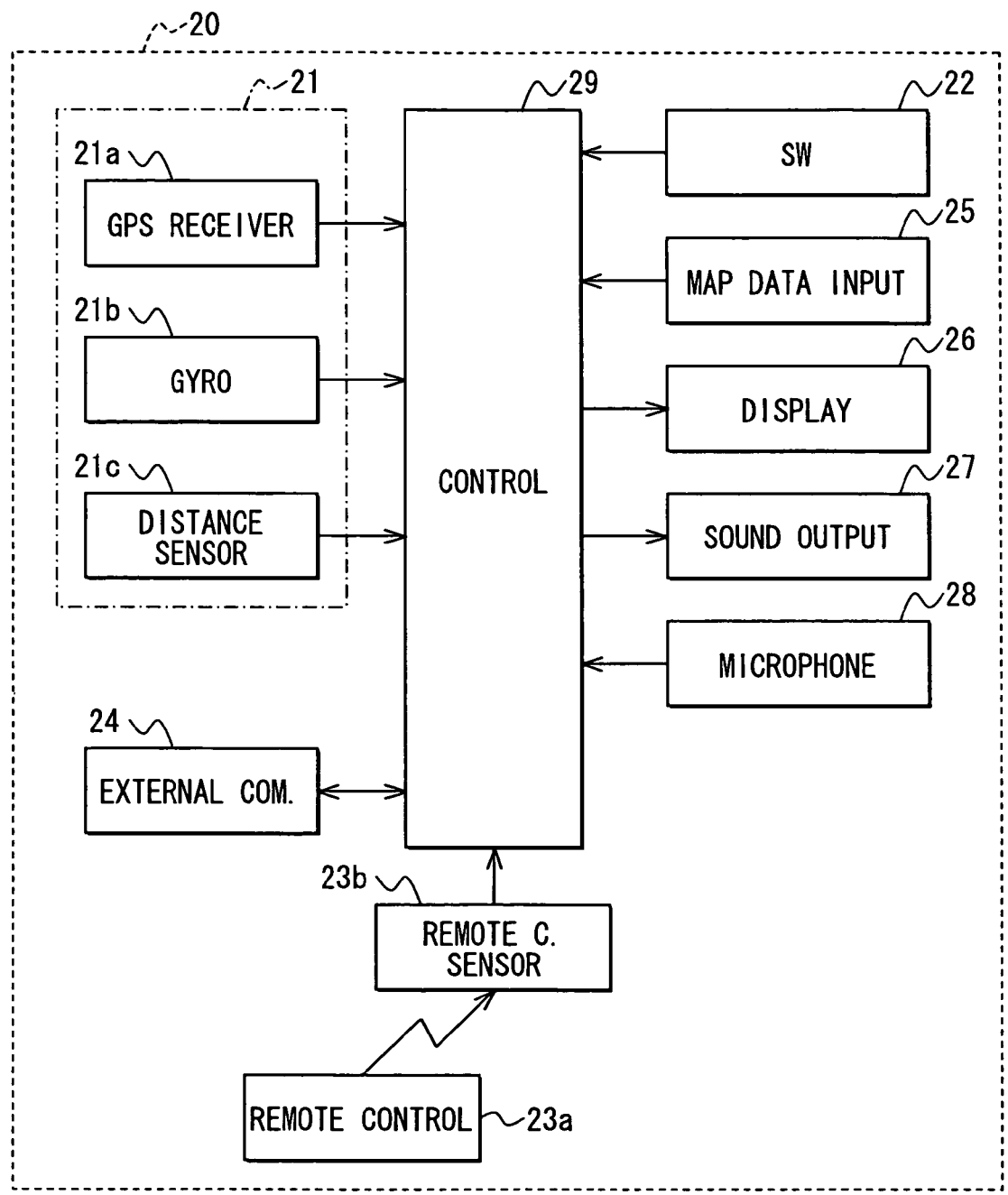
FIG. 1 schematically shows a configuration of a navigation system.

FIG. 1 is a block diagram schematically showing a configuration of a navigation system 20 that is an example of an embodiment according to the present invention.

The navigation system 20 is mounted in a vehicle, and includes the following: a position detector 21 that detects the current position of a vehicle; a group of operation switches 22 which a user uses to enter various instructions; a remote control 23a with which various instructions can be entered similarly to the group of operation switches 22 and which is separated from the navigation system 20; a remote control sensor 23b that receives a signal from the remote control 23a; an external communication device 24 that is connected to a packet communication network for communication with outside; a map data input device 25 that receives data from a map storage medium in which map data and audio data are stored; a display 26 that is a displaying unit for displaying a map or various pieces of information; a loudspeaker 27 as a sound output unit via which various guide sounds are radiated; a microphone 28 via which an electric signal proportional to voice uttered by a user is transmitted; and a control unit 29 that performs various processes according to inputs received from the position detector 21, group of operation switches 22, remote control sensor 23b, external communication device 24, map data input device 25, and microphone 28, and controls the external communication device 24, display 26, and loudspeaker 27.

The position detector 21 includes the following: a GPS receiver 21a that receives radio waves radiated from satellites, which are included in the global positioning system (GPS), via a GPS antenna that is not shown, and transmits a reception signal proportional to the radio waves; a gyroscope 21b that detects the magnitude of rotary motion applied to a vehicle; and a distance sensor 21c that detects a distance, by which the vehicle is driven, on the basis of an acceleration in a longitudinal direction of the vehicle. Based on the output signals of the components 21a to 21c, the control unit 29 calculates the position of the vehicle, the azimuth thereof, and the velocity thereof. Various methods are adoptable as a method of calculating a current position on the basis of the output signal of the GPS receiver 21a. Either of a single positioning method and a differential positioning method may be adopted.

The group of operation switches 22 includes mechanical key switches disposed around a touch panel, which is integrated with the display surface of the display 26, and the display 26. The touch panel and display 26 are laminated and integrated with each other. The touch panel may adopt a pressure-sensitive method, an electromagnetic induction method, an electrostatic capacitance method, or a combination thereof.

The external communication device 24 acquires information on an accident or information on a traffic jam from a VICS information center via an optical beacon or a radio beacon installed on a road.

The map data input device 25 is a device that receives various kinds of data recorded on a map data storage medium (a hard disk, DVD-ROM, etc.) which is not shown. Stored in the map data storage medium are map data (a node number, a link number, road shape data, road width data, road type data, a road number, road restriction data, geographical data, mark data, intersection data, facility data, etc.), audio data for use in guiding, and voice recognition data. As for a road including multiple lanes that are separated from one another with a lane separator on which vehicles cannot be driven and that offer the same advancing direction, the link data and audio data for use in guiding are associated with each of the lanes.

The display 26 is a color display device that may be any of a liquid crystal display, an organic electroluminescent display, and a cathode-ray tube. On the display screen of the display 26, a mark representing a current position that is identified based on the current position of a vehicle detected by the position detector 21 and map data received by the map data input device 25 can be displayed while being superimposed on additional data including a guide route to a destination, names, landmarks, and marks representing various facilities. Moreover, a guide to each facility can be displayed.

The loudspeaker 27 can radiate or output sounds which are received from the map data input device 25 and with which a guide to a facility or other various guides are given.

The microphone 28 receives speech uttered by a user, and transmits an electric signal (audio signal), which is proportional to the received speech, to the control unit 29. The user utters various pieces of speech toward the microphone 28, whereby the user can operate the navigation system 20.

The control unit 29 is realized mainly with a known microcomputer including a CPU, a ROM, a RAM, an SRAM, an I/O port, and a bus over which the components are interconnected. Based on any of programs stored in the ROM and RAM, the control unit 29 executes various processes. For example, the control unit 29 performs the process of calculating the current position of a vehicle on the basis of each detection signal sent from the position detector 21 so as to provide coordinates and an advancing direction, and displaying on the display 26 a map that shows the current position and its surroundings and that is read from the map data input device 25. Moreover, the control unit 29 performs route calculation so as to calculate an optimal route from the current position to a destination on the basis of map data stored in the map data input device 25 and the destination designated by manipulating the group of operation switches 22 and the remote control 23a. Moreover, the control unit 29 performs route presentation so as to present a route by displaying on the display 26 the calculated route or by radiating voice via the loudspeaker 27. In the route presentation, points needed for guiding are calculated based on the result of route calculation, shape data of a road included in map data, information on the positions of intersections, and information on the positions of railway crossings. Moreover, what guide (instructions to turn to the right or left, that is, navigation) is needed is determined.

(Outline of Display Control)

Figure 2:
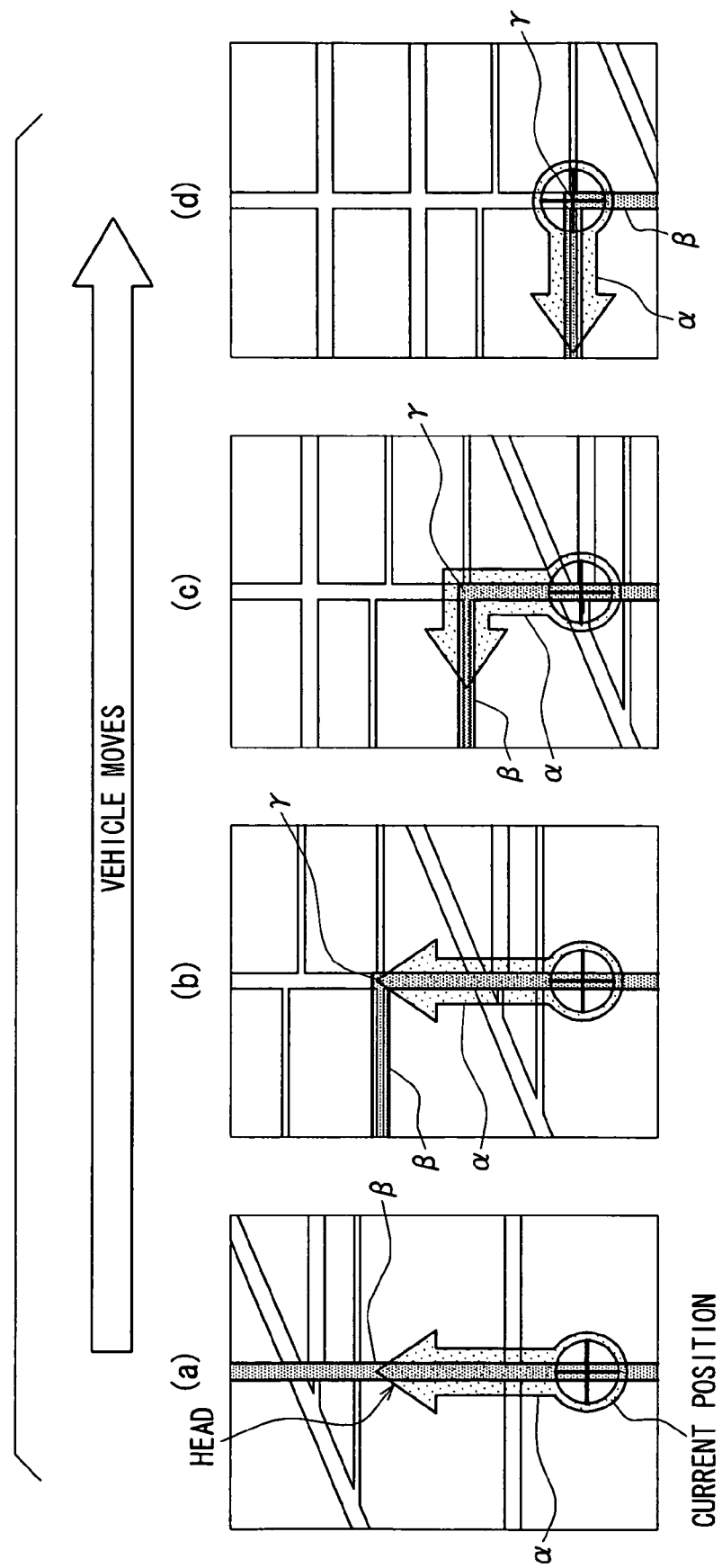
FIG. 2 includes explanatory diagrams showing examples of display of an arrow α employed in an embodiment.

Incidentally, in the navigation system 20 of the present embodiment, during route presentation, a map image showing a current position and its surroundings is, as shown in FIG. 2, displayed on the display 26. Moreover, a route β resulting from route calculation is superimposed on the map image, and an arrow α is also superimposed on the map image. The arrow α includes a base that indicates the current position, an arrowhead that points out a forward position separated by a predetermined distance L along the route β (see FIG. 4A, FIG. 4B, and FIG. 4C), and a segment leading to the arrowhead. For example, the base of the arrow α is a current-position cursor that encircles a cross, and the point of intersection of the cross indicates the current position. The thickness of the arrow α is about three times larger than the thickness of the route β. Needless to say, the thickness can be designated arbitrarily. However, since the arrow is superimposed on the route β, the thickness of the arrow should preferably be different from the thickness of the route β. The current-position cursor, arrowhead, and segment shall constitute the arrow α.

For superimposition, the transparency of the arrow α employed in the present embodiment can be adjusted so that the arrow will look half transparent and a map image or the route β will be discernible through the arrow. Consequently, even when the arrow α is superimposed on the map image and route β, the map image and route β can be prevented from being indiscernible.

The arrow α is displayed to move along with the shift of the current position along the route derived from driving of a vehicle. FIG. 2 shows the movement of the arrow α achieved in a case where the vehicle is turned to the left at an intersection on the route β. Referring to FIG. 2, the display of the arrow α changes from the state shown in (a) through the states shown in (b) and (c) to the state shown in (d) along with the driving of the vehicle. To begin with, in the states shown in (a) and (b), since the route β is rectilinear, the shape and length of the arrow α does not change but the arrow α keeps moving along the route β. In the state shown in (b), after the arrowhead of the arrow α reaches an intersection, when the vehicle is driven farther, the arrowhead is turned to the left as seen from in the state shown in (c). Namely, since the arrow α is displayed along the route β, the arrowhead portion is disposed on a road on which the vehicle is driven after turned to the left on a road on which the base of the arrow α exists. After the vehicle is driven farther, when the current position reaches the intersection, the arrow α enters the state shown in (d).

Figure 3:
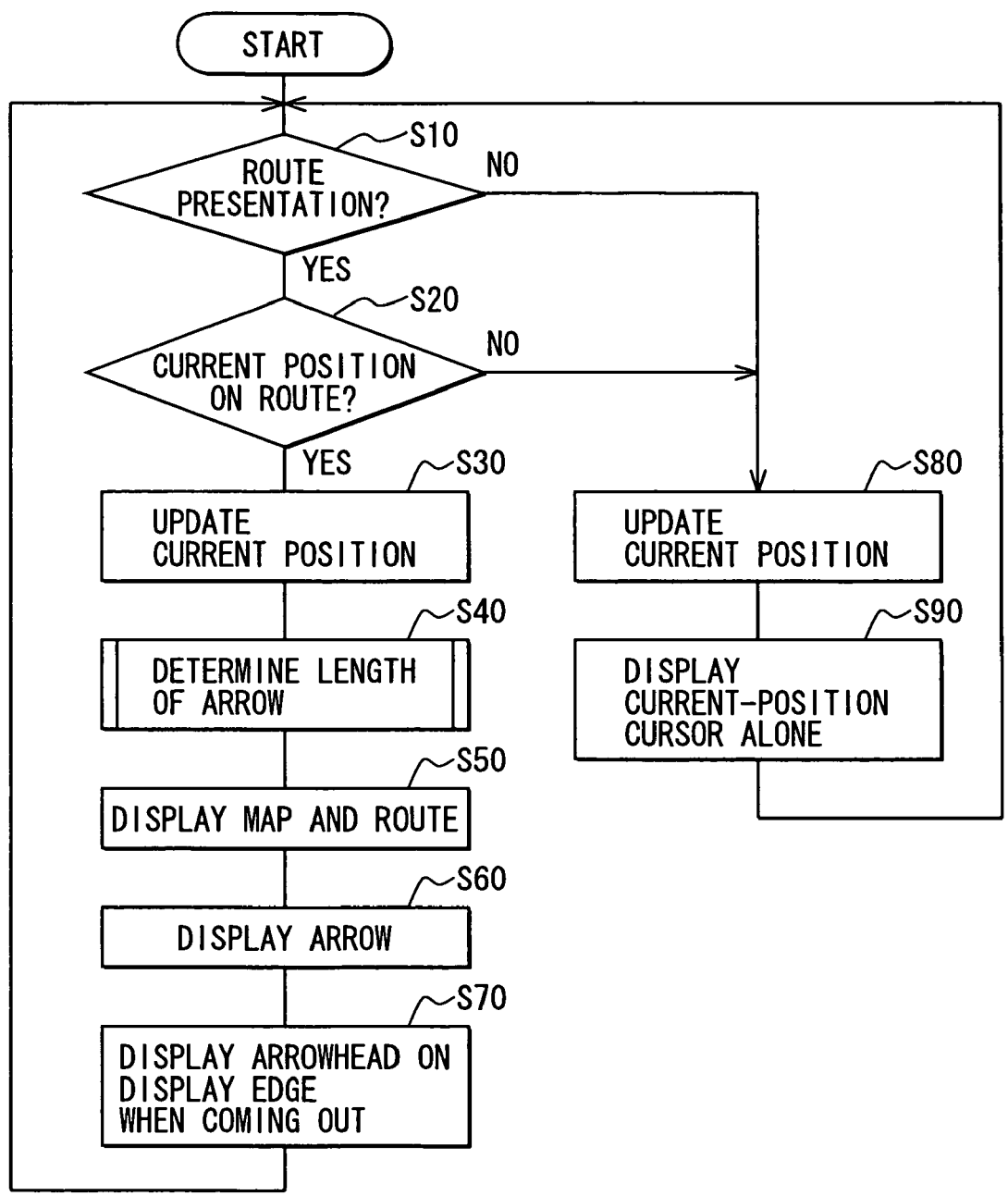
FIG. 3 is a flowchart describing display control.

Next, among processes included in route presentation to be executed by the control unit 29, display control that is process characteristic of the navigation system 20 of the present embodiment for controlling display of the arrow α will be described below with reference to the flowchart of FIG. 3. The display control is achieved in parallel to the other process included in the route presentation, for example, audio route presentation. Incidentally, the route calculation and the audio route presentation which are executed by the navigation system are identical to those performed according to a conventional technique. An iterative description will be omitted.

When the control unit 29 initiates display control, the control unit 29 decides whether route presentation is in progress (S10). When route presentation is in progress (Yes at S10), a decision is made on whether the current position lies on a route (S20). When the current position lies on the route (Yes at S20), the stored current position is updated (S30).

Figure 4A:
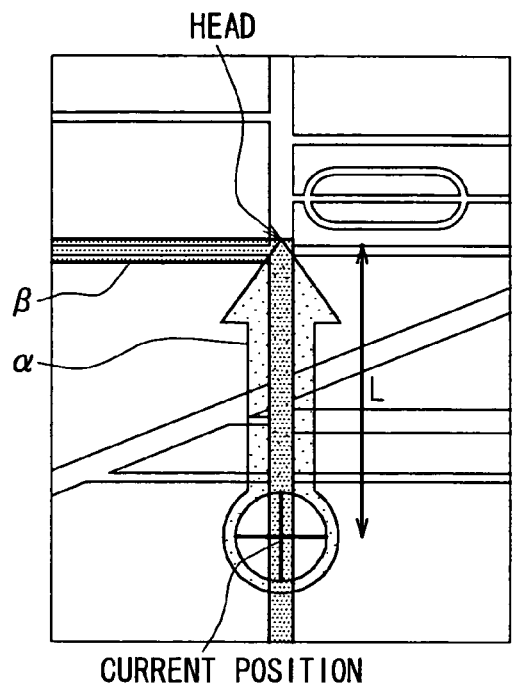
FIG. 4A to FIG. 4C are explanatory diagrams showing basic rules for display of the arrow α.
Figure 4B:
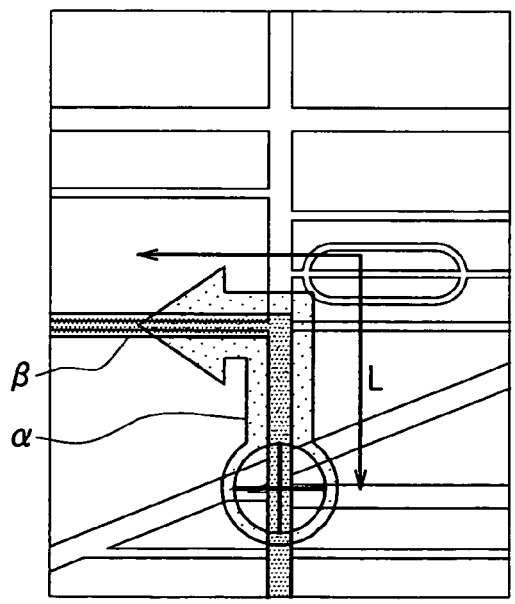
Figure 4C:
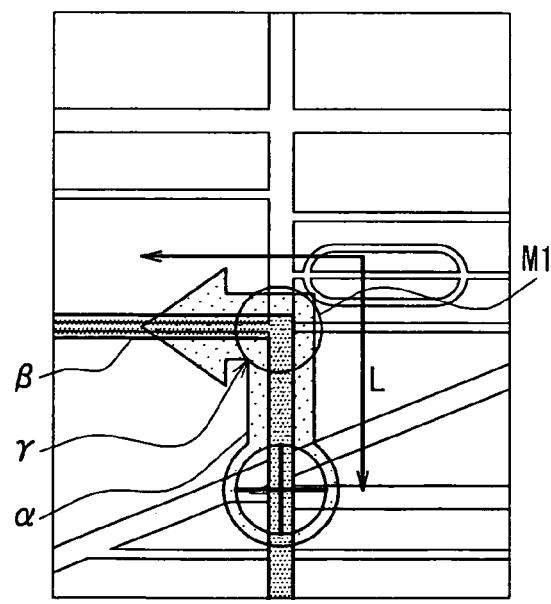

Thereafter, the length L of the arrow α is determined (S40). The length L of the arrow α signifies, as shown in FIG. 4A, FIG. 4B, and FIG. 4C, a distance from the current position to a position indicated by the arrowhead of the arrow in a map. The method of determining the length L of the arrow α will be described later.

After the length L of the arrow α is determined, a map showing the current position and its surroundings and the calculated route are displayed on the display 26 (S50). The arrow α having the length L is displayed along a route β on the display 26 (S60). In other words, the map image, route β, and arrow α are displayed while being superimposed on one another. When the head of the arrow α (that is, the arrowhead portion) comes out of the display screen of the display 26, the arrowhead is displayed on the edge of the display screen (S70). Namely, the length L of the arrow α looks shorter.

As mentioned above, since the arrow α is displayed in a half transparent form, even when the arrow α is superimposed on the map image and route β, the map image and route β are discernible.

On the other hand, supposing route presentation is not in progress (No at S10), or supposing the current position does not lie on the route (No at S20), after the current position is updated (S80), the current-position cursor alone is displayed (S90).

After the process of S70 or S90 is completed, control is returned to S10. The process of S10 and thereafter are repeated.

(Basic Rules for Display of the Arrow α)

Referring to FIG. 4A to FIG. 4C and FIG. 5, the basic rules for display of the arrow α will be described below.

As mentioned above, the arrow α is moved along the route β with the length L held intact. Specifically, even when the arrow α is, as shown in FIG. 4A, linear, or even when the arrowhead portion thereof is, as shown in FIG. 4B, bent, the length L from the point of intersection of the base indicating the current position to the arrowhead remains constant in principle.

FIG. 5 lists four methods of determining the length L of the arrow α.

Examples 1 and 2 are determining methods associated with audio route presentation. Example 1 is intended to determine the length L of the arrow α in accordance with a given position at which audio guide is given, while example 2 is intended to determine the length L of the arrow α in accordance with a position further than the given position from a guide point γ.

For example, assuming that the guide point γ is an intersection, when audio guide saying "Turn to the left at the next intersection" is given at a position 700 m short of the intersection, the length of the arrow is determined to indicate 700 m according to the determining method of example 1. In this case, when audio guide is given, the arrowhead of the arrow α is disposed at the intersection. Moreover, according to the determining method of example 2, the length of the arrow α is determined to indicate 800 m a little larger than 700 m that is the distance determined for giving audio guide. In this case, when audio guidance is given, the arrowhead of the arrow α is disposed at a position a little beyond the left corner of the intersection. This allows a user to intuitively discern a direction into which the user should make a turn.

Figure 24A:
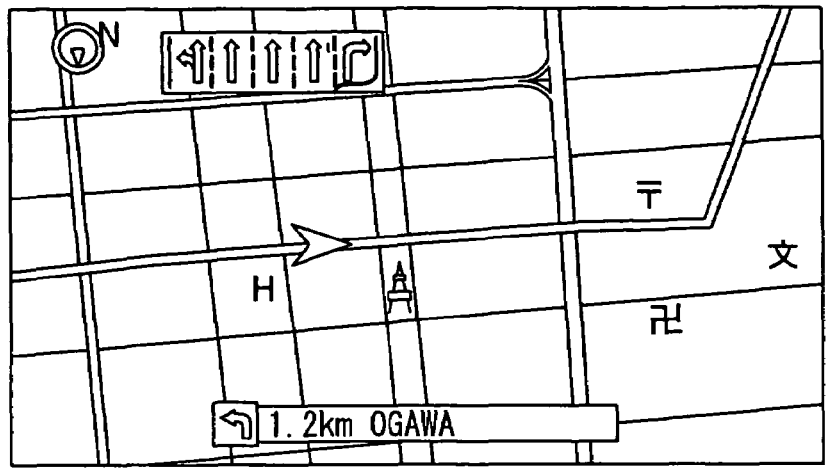
FIG. 24A to FIG. 24C are explanatory diagrams concerning a prior art.

Example 3 is a determining method intended to make the arrow α more discernible according to a reduction scale employed in a displayed map. The length L of the arrow α is determined so that as the reduction scale employed in a map image is smaller (as a map displayed on a screen show a wider region), the length L of the arrow α will be larger (the arrow α can cover a larger distance in the map). For example, when a 100 m reduction scale (that is, a reduction scale in which a unit length indicates 100 m (FIG. 24B)) is adopted, the length L is determined to indicate 600 m. When a 200 m reduction scale (that is, a reduction scale in which the unit length indicates 200 m (FIG. 24A)) is adopted, the length L is determined to indicate 1200 m. When a 400 m reduction scale (that is, a reduction scale in which the unit length indicates 200 m) is adopted, the length L is determined to indicate 2400 m.

Example 4 is a determining method which is a combination of examples 2 and 3 and in which both audio route presentation and a reduction scale are considered. For example, when the 100 m reduction scale is adopted, the length L is determined to indicate 800 m. Even when the 200 m reduction scale is adopted, the length L is determined to indicate 800 m. When the 400 m reduction scale is adopted, the length L is determined to indicate 2400 m. Namely, when the 100 m reduction scale or 200 m reduction scale is adopted, a priority is given to the audio route presentation. When the 400 m reduction scale is adopted, a priority is given to visibility.

(Advantages Provided by Displaying the Arrow α)

The configuration of the present embodiment and the actions to be performed therein have been described so far. According to the navigation system 20 of the present invention, since the arrow α is synthesized with the map image and route β and displayed on the display 26 during route presentation, the advantages described below are provided.

(1) The base of the arrow α indicates a current position and therefore allows a user to check the current position. Moreover, since the arrowhead indicates a forward position separated by a predetermined distance along the route β, the entire arrow including the arrowhead allows the user to check the direction of the route. Namely, the user can check both the current position and the direction of the route without the necessity of moving the user's line of vision.

Figure 24B:
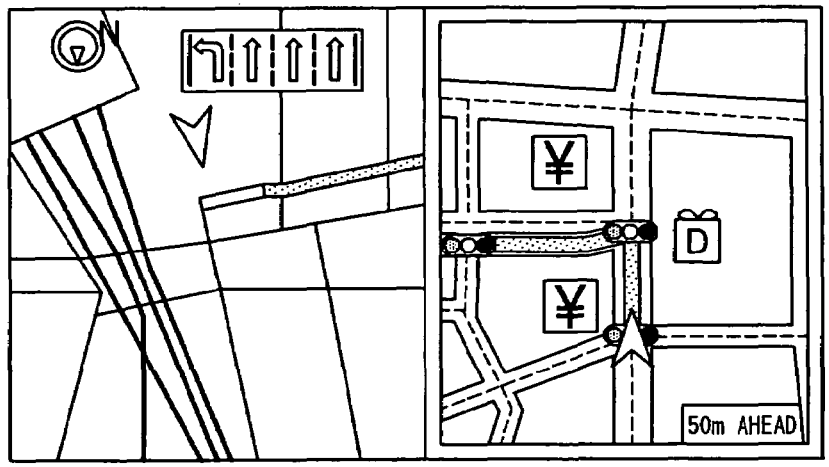
Figure 24C:
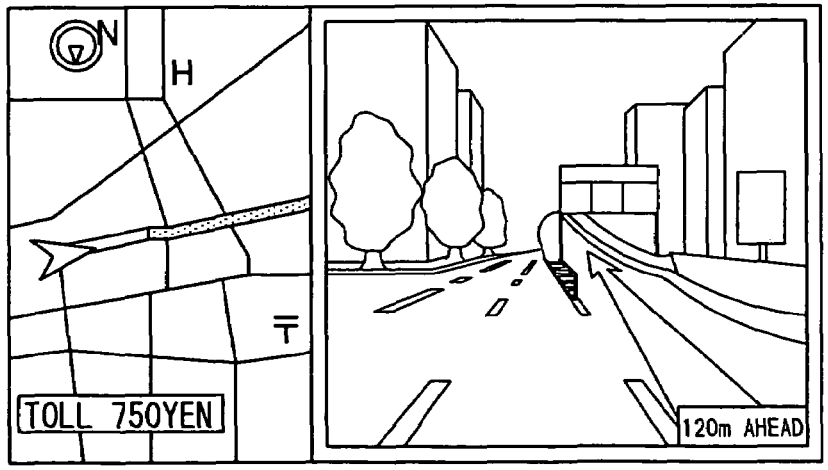

(2) The conventional method displays two screen images of an enlarged view and a map image like the ones shown in FIG. 24B and FIG. 24C for the purpose of giving directional guide; the conventional method is hard to apply to a system that is supposed to display an image on a small screen or a lengthwise long screen. Supposing the conventional method were applied, visibility would be impaired. In contrast, as illustrated in FIG. 2 and others, the present embodiment can display both the map image and a presentation of directional guide on one screen and may be applied without any problem to the system supposed to display an image on the small screen or lengthwise long screen.

(3) Since the arrow α includes the base that indicates a current position and the arrowhead that points out a forward position separated by the predetermined distance L along the route β (namely, the arrow α has the length L), a user looking at the arrow α will readily get the sense of a distance. Assuming that the length L of the arrow α indicates 700 m, when the arrowhead is, as shown in (b) in FIG. 2, disposed at an intersection at which a vehicle should be turned left, the distance from the current position to the intersection is seen to be 700 m. Furthermore, even when the vehicle is, as shown in (c) in FIG. 2, approaching the intersection, supposing the user knows that the length of the entire arrow α indicates 700 m, the user can approximately grasp the distance from the current position to the intersection. Assuming that the state shown in (c) in FIG. 2 is established, since about three sevenths of the arrow α from the distal end thereof overpasses the intersection, the user can grasp that the distance from the current position to the intersection is approximately 400 m. These advantages are provided because as the current position shifts along with driving of a vehicle, the arrowhead of the arrow α is moved synchronously. The technological idea of displaying the arrow α is an unprecedentedly remarkable feature.

(4) Depending on the size of the display screen of the display 26, the arrowhead of the arrow α may sometimes come out of the display screen of the display 26. The present embodiment has the countermeasure. Specifically, as described at S70 in FIG. 3, when the head of the arrow α (that is, the arrowhead portion) comes out of the display screen of the display 26, the arrowhead is displayed on the edge of the display screen.

Idea for display of the arrow α and advantages

Aside from the basis rules for display of the arrow α, ideas for display and resultant advantages will be described below.

(Idea 1) Superimposing a mark that represents a guide point γ

Figure 7A:
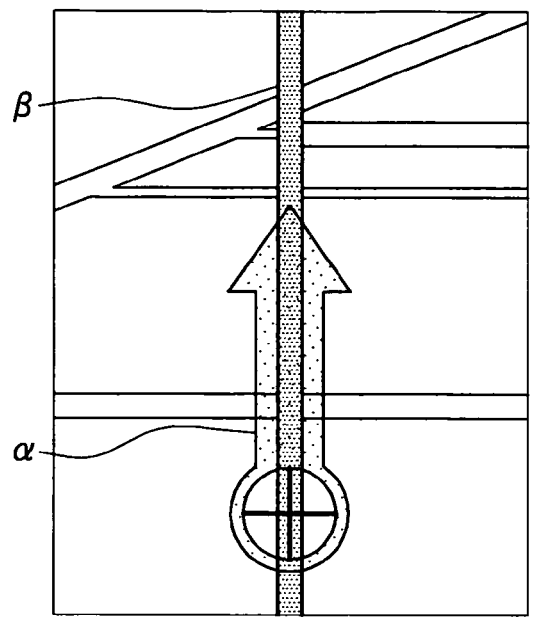
FIG. 7A to FIG. 7C are explanatory diagrams showing ideas devised for a case where the length L of the arrow α is adjusted when the arrowhead thereof approaches an intersection.
Figure 7B:
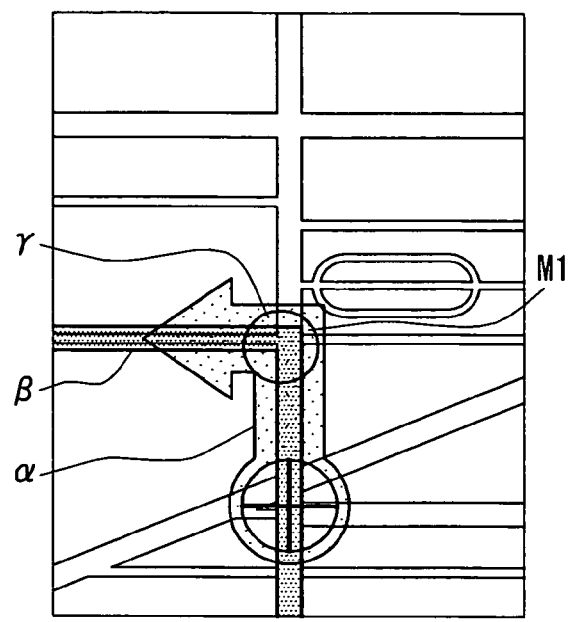
Figure 7C:
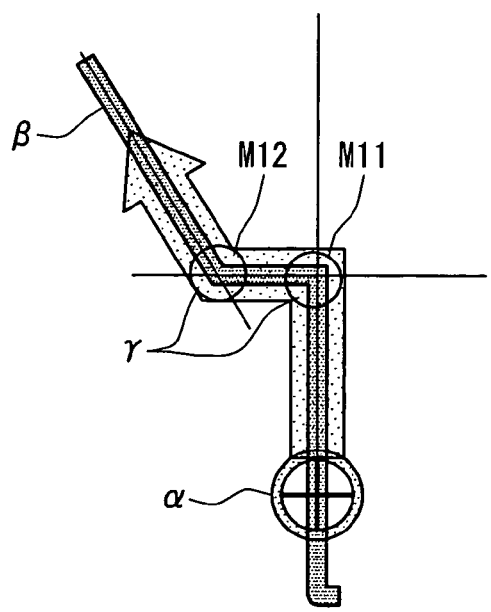
Figure 11A:
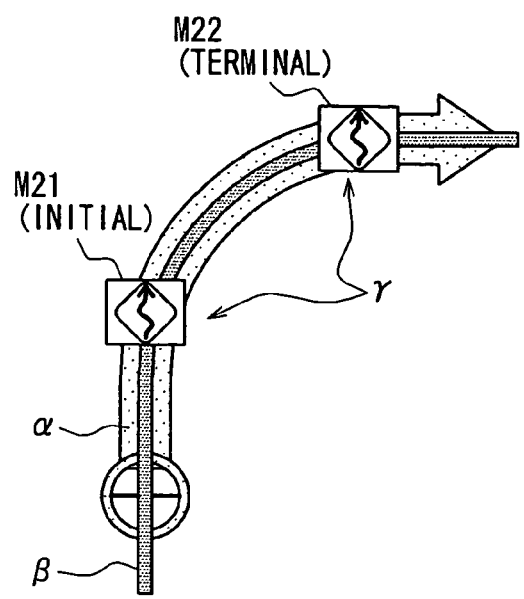
FIG. 11A to FIG. 11E are explanatory diagrams showing examples of display of the arrow α over various guide points, examples of guide point marks, and example of highlighting.
Figure 11B:
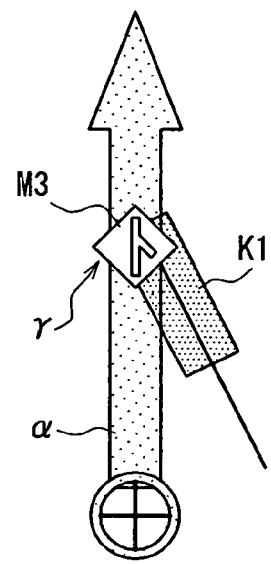
Figure 11C:
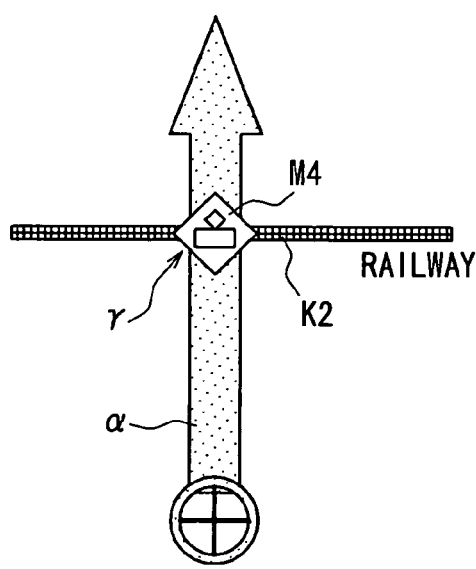
Figure 11D:
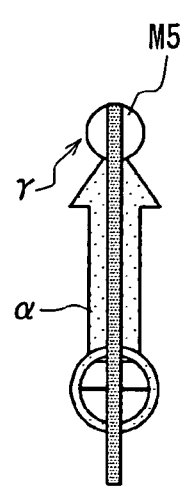
Figure 11E:
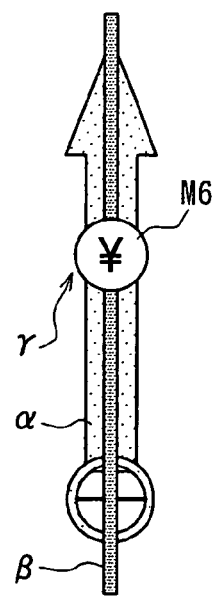

Various points are conceivable as the guide point γ on the route β. The mark representing the guide point γ includes an intersection guide shown in FIG. 4C, FIG. 7B, or FIG. 7C, and a curve warning, a junction mark, a railway crossing mark, a destination guide, and a toll gate warning which are shown in FIG. 11A to FIG. 11E. What a guide point mark represents may be inferred from a map image but should preferably be able to be intuitively grasped. When the arrow α exists at a predetermined guide point γ on the route β, a predetermined mark representing the guide point γ should be superimposed on the arrow α. For example, FIG. 4C, FIG. 7B, and FIG. 7C show intersection marks M1, M11, and M12 respectively. FIG. 11A shows an initial point mark M21 and a terminal point mark M22 representing the initial and terminal points of a curve. FIG. 11B shows the junction mark M3, and FIG. 11C shows the railway crossing mark M4. FIG. 11D shows the destination mark M5, and FIG. 11E shows the toll gate mark M6.

(Idea 2) Coloring or Graduating the Arrow

The length L of the arrow α can be designated arbitrarily. In reality, the length may indicate 700 m or may indicate a longer distance according to a reduction scale, as explained above. Supposing the distance indicated by the overall length L of the arrow α is known, the distance of a road or an intersection, which is disposed in the middle of the arrow α, from a current position must be grasped by eye. Even when the distance is grasped by eye, the distance can be approximately measured. Furthermore, ideas described below may be adopted.

The arrow α shown in FIG. 6A has the portion thereof between the base thereof and the arrowhead thereof varied in colors. For example, the arrow α is trisected to have the three sections thereof colored differently. The arrow α shown in FIG. 6B has the portion thereof between the base thereof and the arrowhead thereof graduated to have a scale mark at regular intervals. For example, supposing the length L of the arrow α indicates 700 m, the arrow α is graduated with the point of intersection indicating a current position as an initial point so that a scale mark will be drawn at intervals of a length indicating 200 m.

Owing to the above idea, the distance of a road or an intersection, which is disposed in the middle of the arrow α, from a current position can be more accurately grasped.

FIG. 6A shows an example in which the arrow α is trisected and the three portions are colored differently. The same advantage would be provided by varying the shape of the arrow α. For example, the thickness of the arrow α may be varied in three steps (tapered or gradually thickened).

(Idea 3) Adjusting the length of the arrow when the arrowhead reaches a guide point The length L of the arrow α may be dynamically changed based on a situation of guiding along the route β.

For example, when the arrowhead reaches a predetermined guide point γ other than a destination on the route β, the length of the arrow α may be adjusted so that the arrowhead will lie beyond the guide point γ. For example, as shown in FIG. 7A, the length L of the arrow α normally indicates 700 m. As shown in FIG. 7B, when the arrowhead reaches an intersection that is the guide point γ, the length of the arrow α may be temporarily increased so that the distance indicated by the length will be 100 m larger or 800 m.

In this case, the arrowhead lies a little beyond the left corner of the intersection, and a user can intuitively discern a direction in which the user should make a turn.

Assuming that the guide point γ is a destination, the arrow α is not displayed to overpass the destination. When the arrowhead reaches the destination on the route β, the length of the arrow α is adjusted so that the arrowhead will be locked at the destination (see FIG. 11D). Namely, the arrowhead is locked at the destination, and the length of the arrow α is gradually decreased along with the shift of a current position.

When the arrowhead reaches a predetermined guide point γ on the route β other than a destination, the length L of the arrow α is adjusted so that the arrowhead will lie beyond the guide point γ. Thereafter, the length should preferably be returned to the original length L. Various ways of returning the length to the original length are conceivable. A description will be made using a concrete example of an intersection. Assuming that since the arrowhead reaches the intersection, the length of the arrow is temporarily increased so that the distance indicated by the length will be 800 m and the arrowhead will lie a little beyond the left corner of the intersection. In this case, the arrowhead is temporarily locked and the length L of the arrow α is waited to return to indicate 700 m along with the shift of a current position. When the length L of the arrow α is returned to indicate 700 m, the arrow α is moved along with the shift of the current position with the length L, which indicates 700 m, held intact. This method of gradually returning the length of the arrow to the original length may be adopted. Otherwise, the length L indicating 800 m may be retained until, for example, the current position passes the intersection, and then returned to indicate 700 m.

FIG. 7B shows a case where the number of intersections that are guide points γ is one. Intersections may succeed one another as shown in FIG. 7C. In this case, as long as the distance between intersections falls within a predetermined distance, the length of the arrow α is adjusted so that the arrow α will cover the nearest intersection (represented by a mark M11) and an intersection to be presented next (represented by a mark M12) with the arrowhead thereof disposed as if to 100 m overpass the intersection to be presented next which is represented by the mark M12.

Figure 8:
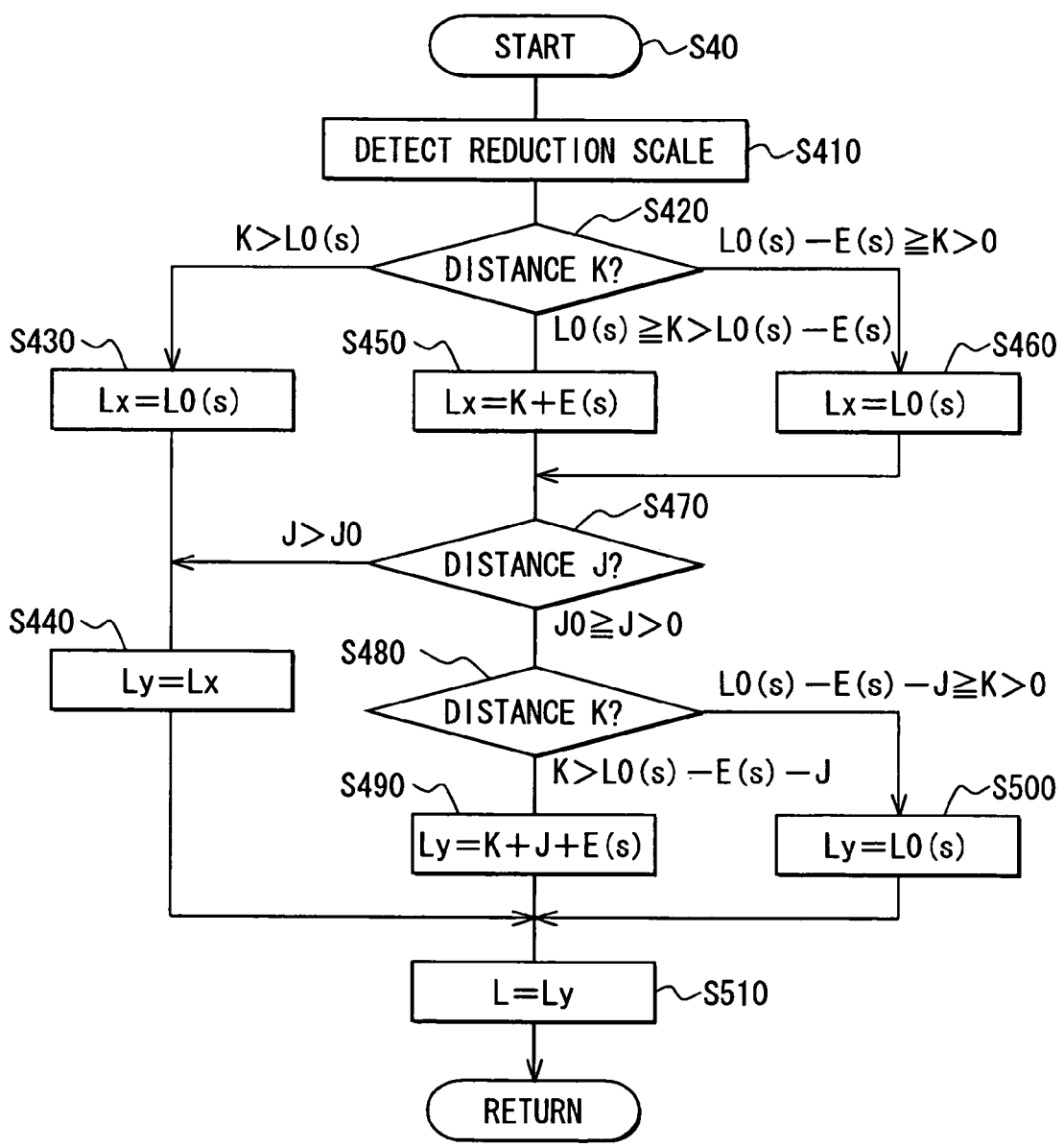
FIG. 8 is a flowchart describing length determination during which length adjustment is executed.

Process the control unit 29 performs will be described with reference to the flowchart of FIG. 8. This process is performed in a case where the length L of the arrow α is, as mentioned above, adjusted when the arrowhead reaches an intersection that is a guide point γ. FIG. 8 describes a subroutine as an example of the process of S40.

Reference numerals employed in the flowchart of FIG. 8 will be explained below. Lx and Ly denote variables, and L0(s), E(s), and J0 denote constants. Among them, J0 is set to 750 m irrespective of a reduction scale, but L0(s) and E(s) vary depending on the reduction scale. For a 50 m reduction scale, L0(s) is set to 350 m and E(s) is set to 50 m. For a 100 m reduction scale or a 200 m reduction scale, L0(s) is set to 700 m and E(s) is set to 100 m. For a 400 m reduction scale and an 800 m reduction scale, L0(s) is set to 3000 m and E(s) is set to 500 m.

When the process described in FIG. 8 is initiated, a reduction scale employed for a displayed image is detected (S410), and a conditional decision is made on a distance K from a current position to the nearest intersection which is to be presented (S420).

For example, when K>L0(s) is established, control is passed to S430 and Lx is set to the same value as L0(s). At the next S440, Ly is set to the same value as Lx. Thereafter, control is passed to S510. The length L is determined to indicate the same value as Ly.

On the other hand, supposing L0(s)≧K>L0(s)−E(s) is established, control is passed to S450. Lx is set to the same value as K+E(s). In contrast, supposing L0(s)−E(s)≧K is established, control is passed to S460. Lx is set to the same value as L0(s). After S450 or S460 is completed, control is passed to S470. A conditional decision is made on a distance J from the nearest intersection to be presented to an intersection which is to be presented next.

For example, supposing J>J0 is established, control is passed to S440. Supposing J0≧J≧0 is established, control is passed to S480. The same decision making as the one of S420 is performed, that is, a conditional decision is made on the distance K from the current position to the nearest intersection to be presented. Supposing K>L0(s)−E(s)−J is established, Ly is set to the same value as K+J+E(s) (S490). Thereafter, control is passed to S510 and the length L is determined to indicate the same value as Ly. On the other hand, supposing L0(s)−E(s)−J≧K>0 is established, Ly is set to the same value as L0(s) (S500). Thereafter, control is passed to S510 and the length L is determined to indicate the same value as Ly.

Taking for instance a case where the 100 m reduction scale is adopted, L0(s) is set to 700 m, and E(s) is set to 100 m, a description will be made below.

Assuming that a current position is separated 700 m or more from the nearest intersection to be presented, control is passed to S430 after a decision is made at S420. Thereafter, the length L is set to the same value as L0(s)=700 m through S440 and S510.

When the current position is 700 m short of the nearest intersection to be presented, control is passed to S450. The value Lx is calculated as K+E(s), that is, 700 m+100 m=800 m. Supposing intersections do not succeed one another, control is passed to S440 after a decision is made at S470. Thereafter, the length L is calculated as K+E(s)=800 m at S510. Thereafter, control is passed from S420 to S450 until the current position reaches the position L0(s)−E(s)=600 m short of the nearest intersection to be presented. Thereafter, through S470, S440, and S510, the length of the arrow α is calculated by adding E(s)=100 m to the distance K from the current position to the nearest intersection to be presented. When the arrowhead reaches the intersection, the length L of the arrow α is increased to indicate a 100 m longer distance. With the arrowhead temporarily locked, the length L of the arrow α is decreased along with the shift of the current position.

When the current position reaches a position 600 m short of the nearest intersection to be presented, control is passed to S460 and Lx is set to the same value as L0(s). Thereafter, through S470, S440, and S510, the length L is set to the same value as L0(s)=700 m. In other words, after the length L of the arrow α is temporarily increased to indicate 800 m, the length L is decreased along with the shift of the current position. Once the length L of the arrow α returns to indicate 700 m, the length is not decreased any longer but is held intact to indicate 700 m.

Even when intersections succeed one another, the same idea as the aforesaid one is adopted. Specifically, when the distance between intersections falls below 750 m, control is passed to S480 after a decision is made at S470. Thereafter, through S490 and S510, the length L is temporarily decreased to indicate K+J+E(s). As described with reference to FIG. 7C, the arrow α has the length L that covers the nearest intersection (represented by a mark M11) and an intersection to be presented next (mark M12) with the arrowhead thereof disposed as if to 100 m overpass the intersection to be presented next which is represented by the mark M12. With the arrowhead temporarily locked, the length L of the arrow α is decreased along with the shift of the current position. Once the length L of the arrow α is returned to indicate 700 m, the length is not decreased any longer but held intact to indicate 700 m at S500.

Figure 9:
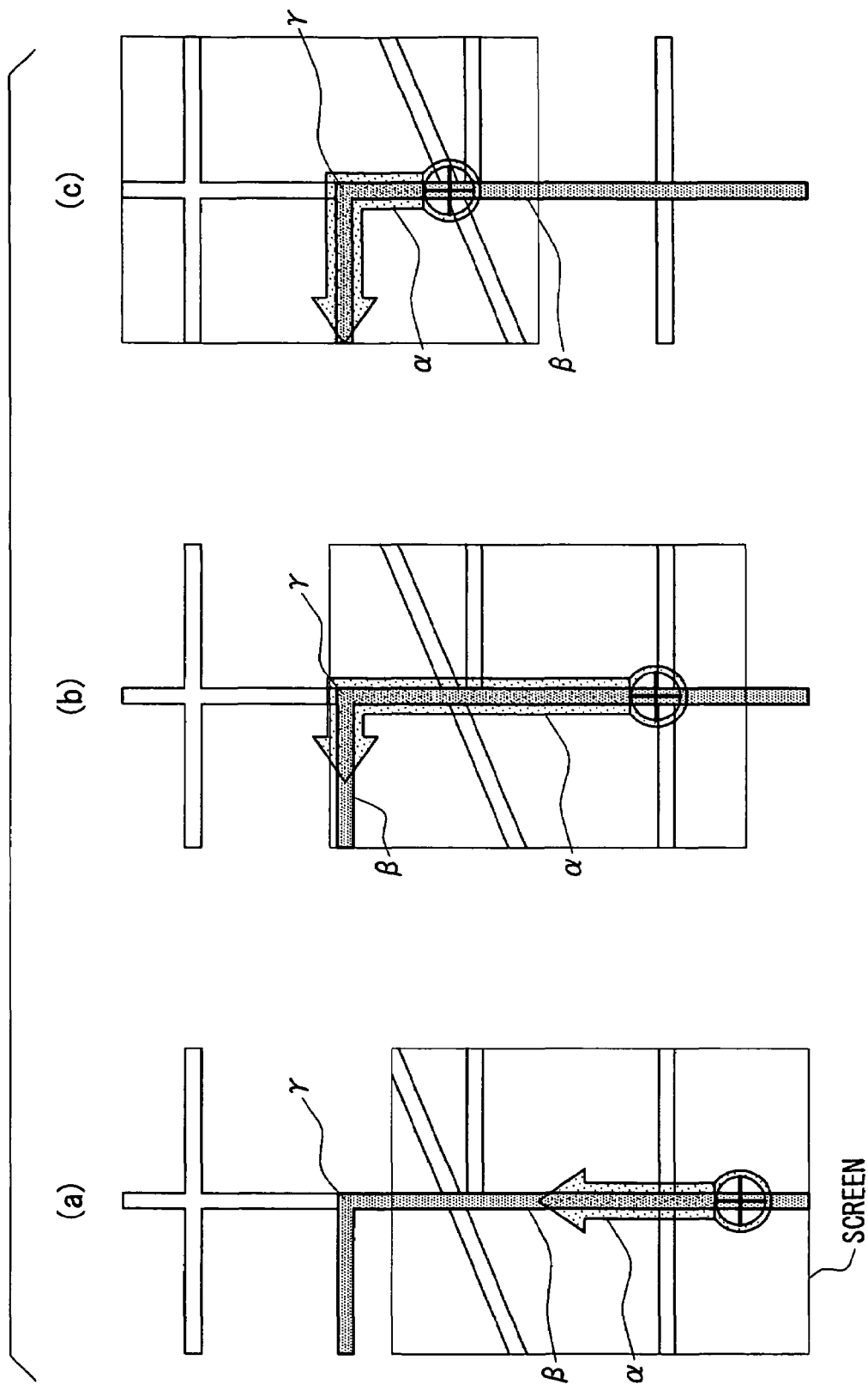
FIG. 9 includes explanatory diagrams showing ideas devised for a case where the length L of the arrow α is adjusted when a guide point is displayed on a screen.

(Idea 4) Adjusting the length of the arrow when a guide point is display on the screen As shown in FIG. 9, when a predetermined guide point γ other than a destination on the route β is displayed within the display screen of the display 26, the length of the arrow α is adjusted so that the arrowhead will lie beyond the guide point γ. From the viewpoint that a guide point should be presented to a user at the earliest possible time, this idea is preferred. When the user looks at the display screen, supposing the guide point γ is displayed on the display screen, the arrow α has the arrowhead disposed beyond the guide point γ without fail. As shown in FIG. 9, assuming that the guide point γ is an intersection, the user (intuitively) discerns a direction, in which the user should make a turn, at the earliest possible time.

Assuming that the guide point γ is a destination, the arrow (α) will not be displayed to overpass the destination. In other words, the length of the arrow α is adjusted so that the arrowhead will be locked at the destination (see FIG. 11D). Even in this case, a user can (intuitively) discern the destination at the earliest possible time.

Figure 10:
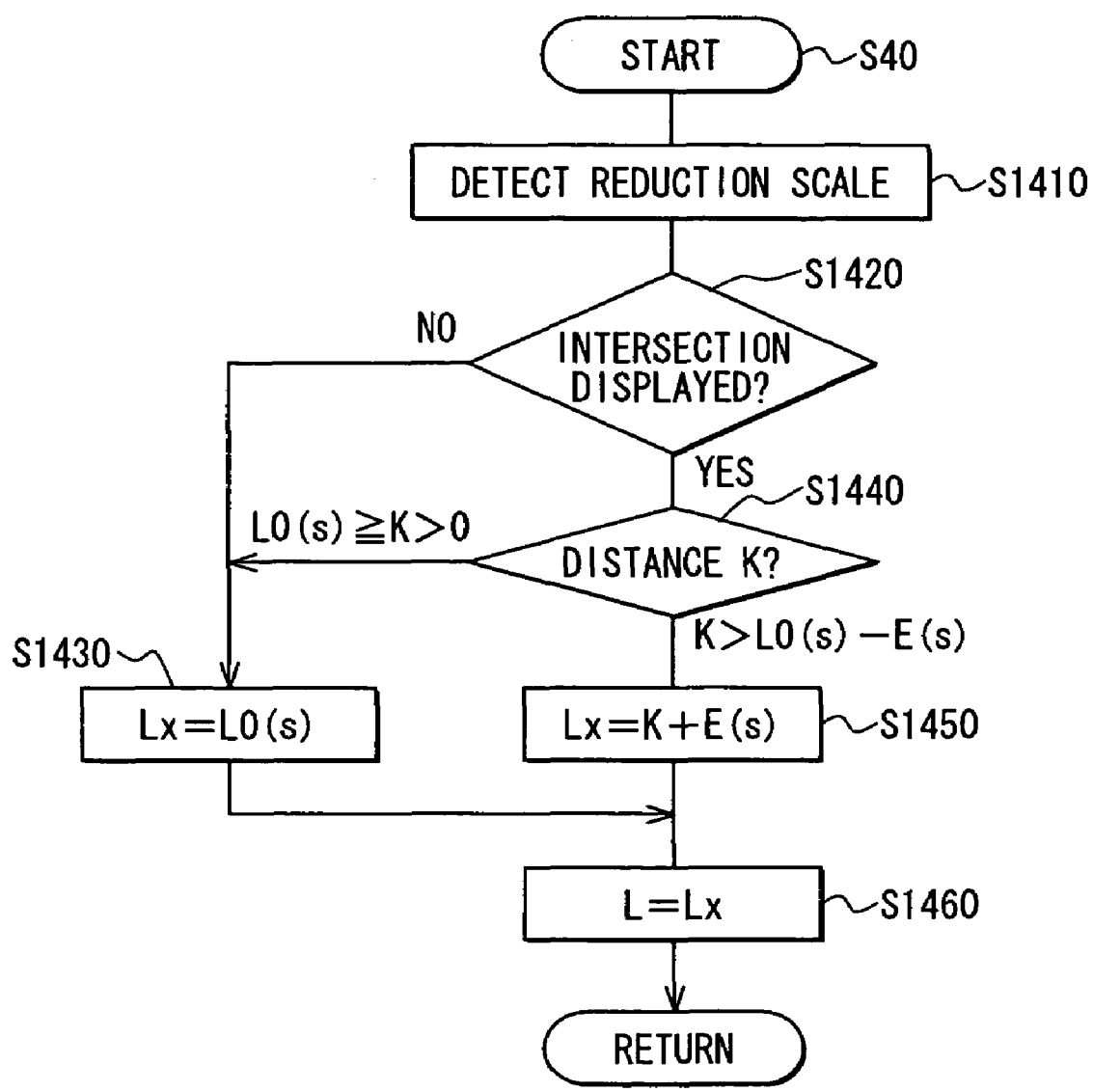
FIG. 10 is a flowchart describing length determination during which length adjustment is executed as shown in FIG. 9.

Another process the control unit 29 performs will be described with reference to the flowchart of FIG. 10. This process is performed in a case where the length L of the arrow α is adjusted when a predetermined guide point γ other than a destination on the route β is displayed on the display screen of the display 26. FIG. 10 describes a subroutine as an example of the process of S40 mentioned in FIG. 3.

Reference numerals employed in the flowchart of FIG. 10 are identical to those described with reference to FIG. 8. An iterative description will be omitted.

When the process described in FIG. 10 is initiated, a reduction scale employed in the display is detected (S1410). A decision is made on whether the nearest intersection to be presented is displayed on the display screen (S1420). Supposing the nearest intersection to be presented is, as illustrated in FIG. 9A, not displayed on the display screen (No at S1420), control is passed to S1430 and Lx is set to the same value as L0(s). Thereafter, L is set to the same value as Lx at S1460.

On the other hand, supposing the nearest intersection to be presented is, as illustrated in FIG. 9B, displayed on the display screen (Yes at S1420), a conditional decision is made on the distance K from a current position to the nearest intersection to be presented (S1440). Supposing L0(s)≧K>0 is established, control is passed to S1430. Supposing K>L0(s)−E(s) is established, control is passed to S1450 and Lx is set to the same value as K+E(s). After S1450 is completed, control is passed to S1460 and L is set to the same value as Lx.

A description will be made more practically by taking for instance a case where the 100 m reduction scale is adopted, L0(s) is set to 700 m, and E(s) is set to 100 m.

The length L of the arrow α is held intact to indicate 700 m until the nearest intersection to be presented is displayed on the display screen. After the nearest intersection to be presented is displayed on the display screen, the arrowhead is, as shown in FIG. 9B, disposed as if to 100 m overpass the intersection. With the arrowhead temporarily locked, the length L of the arrow α is decreased along with the shift of the current position. When the current position reaches a position 700 m short of the nearest intersection to be presented, the length L of the arrow α is returned to indicate 700 m.

(Idea 5) Adjusting the length of the arrow according to a guide point or devising a display method As mentioned above, the guide point γ conceivably includes various points. The mark representing the guide point includes an intersection guide, a destination guide, a toll gate warning, a curve warning, a junction mark, and a railway crossing mark. The predetermined marks representing the respective guide points γ should, as mentioned above, be superimposed on the arrow α.

Not only displaying the marks is employed but also highlighting may be adopted. Specifically, when a predetermined guide point γ is a junction, a joining road is highlighted. When the predetermined guide point γ is the railway crossing, a railway crossing is highlighted. For example, as shown in FIG. 11B, part of the joining road may be represented by a segment K1 that is coupled to the arrow α and that is colored in red or any other color that is effective in attracting attention (when discerned). Moreover, as shown in FIG. 11C, as for the railway crossing, not only a mark M4 representing the railway crossing is displayed but also a railway passing through the railway crossing may be highlighted K2 on the display. This effectively makes the presence of the railway discernible.

(Display Control for a Junction)

Figure 12:
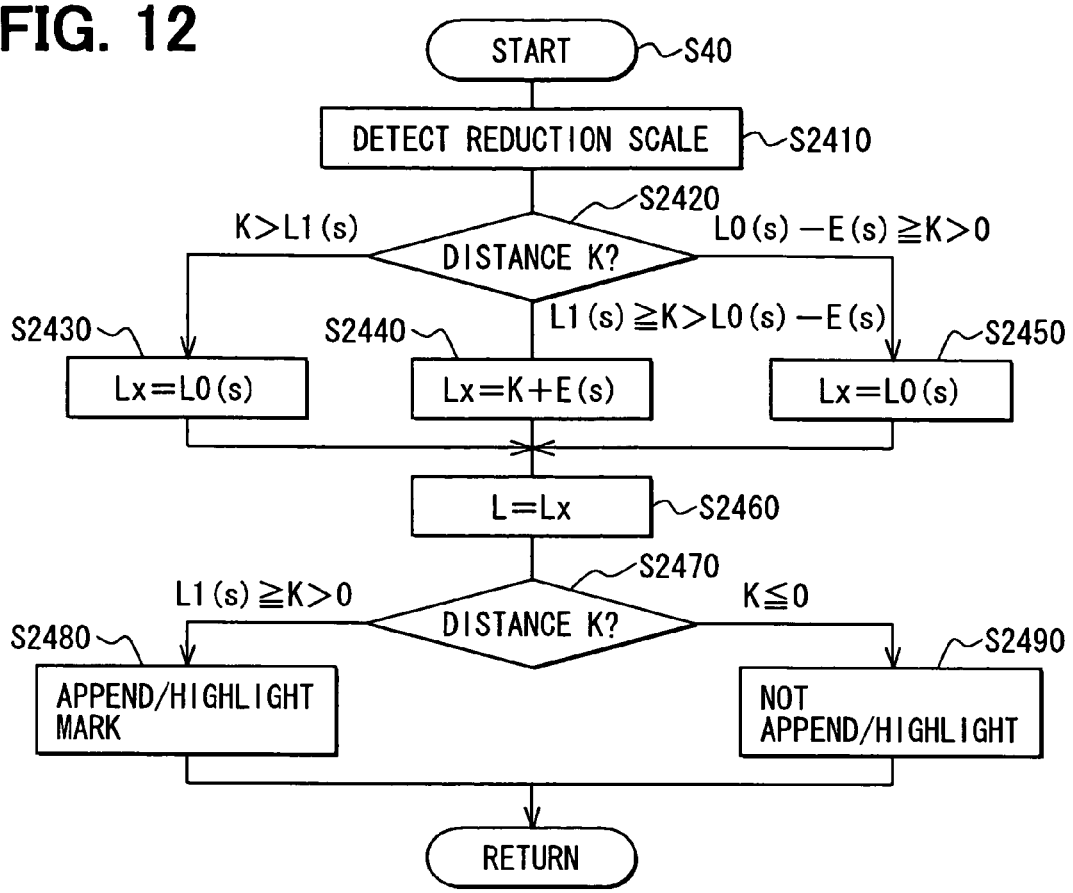
FIG. 12 is a flowchart describing length determination to be executed in order to perform length adjustment or display control in a case where a guide point is a junction.

Process the control unit 29 performs in a case where a guide point mark representing a junction is highlighted will be described with reference to the flowchart of FIG. 12. FIG. 12 describes a subroutine as an example of the process of S40 mentioned in FIG. 3.

Reference numerals employed in the flowchart of FIG. 12 will be described. Lx and Ly denote variables, and L0(s), L1(s), and E(s) denote constants. Among them, L0(s) has been described with reference to FIG. 8. An iterative description will be omitted. Moreover, L1(s) is set to 1000 m and E(s) is set to 100 m.

After the process described in FIG. 8 is initiated, a reduction scale employed in the display is detected (S2410). A conditional decision is made on the distance K from a current position to the nearest intersection to be presented (S2420).

For example, supposing K>L1(s) is established, control is passed to S2430 and Lx is set to the same value as L0(s). The length L is determined to indicate the same value as Lx at S2460.

On the other hand, supposing L1(s)≧K>L0(s)−E(s) is established, control is passed to S2440 and Lx is set to the same value as K+E(s). Supposing L0(s)−E(s)≧K>0 is established, control is passed to S2450 and Lx is set to the same value as L0(s). After S2440 or S2450 is completed, control is passed to S2460 and the length L is determined to indicate the same value as Lx.

The practical meanings of the aforesaid process will be described by taking for instance a case where the 100 m reduction scale is adopted and L0(s) is set to 700 m.

Assuming that a current position is separated L1(s)=1000 m or more from the nearest junction, control is passed to S2430 after a decision is made at S2420. Thereafter, the length L is set to the same value as Lx=L0(s)=700 m at S460.

When the current position reaches a position 1000 m short of the nearest junction, control is passed from S2420 to S2440. The length of the arrow α is calculated as K+E(s), that is, 1000 m+100 m=1100 m. As shown in FIG. 11B, the arrowhead is disposed as if to 100 m overpass the junction. With the arrowhead temporarily locked, the length L of the arrow α is decreased along with the shift of the current position. When the current position reaches a position 600 m short of the nearest junction, since the length L of the arrow α indicates 700 m, the length L of the arrow α is held intact to indicate 700 m thereafter.

While the length L of the arrow α is adjusted, control is extended in order to append a guide point mark M3 to the arrow α and highlight K1 the guide point mark. For example, at S2470, a conditional decision is made on the distance K from the current position to the nearest intersection to be presented. Supposing. L1(s)≧K>0 is established, control is passed to S2480. As shown in FIG. 11B, a guide point mark M3 representing a junction is appended to the arrow α and then highlighted K1. The highlighting K1 is such that a segment which represents part of a joining road and which is coupled to the arrow α is colored in, for example, red or any other color which is effective in attracting attention (when discerned).

Supposing K≦0 is recognized as a decision made at S2470, control is passed to S2490. The guide point mark M3 is neither appended to the arrow α nor highlighted K1 (appending and highlighting are discontinued). Specifically, when the junction is disposed at the arrow α, the guide point mark M3 is appended to the arrow α and highlighted K1. Supposing the current point has passed the junction, the appending and highlighting are not performed any longer.

(Display Control for a Railway Crossing)

Figure 13:
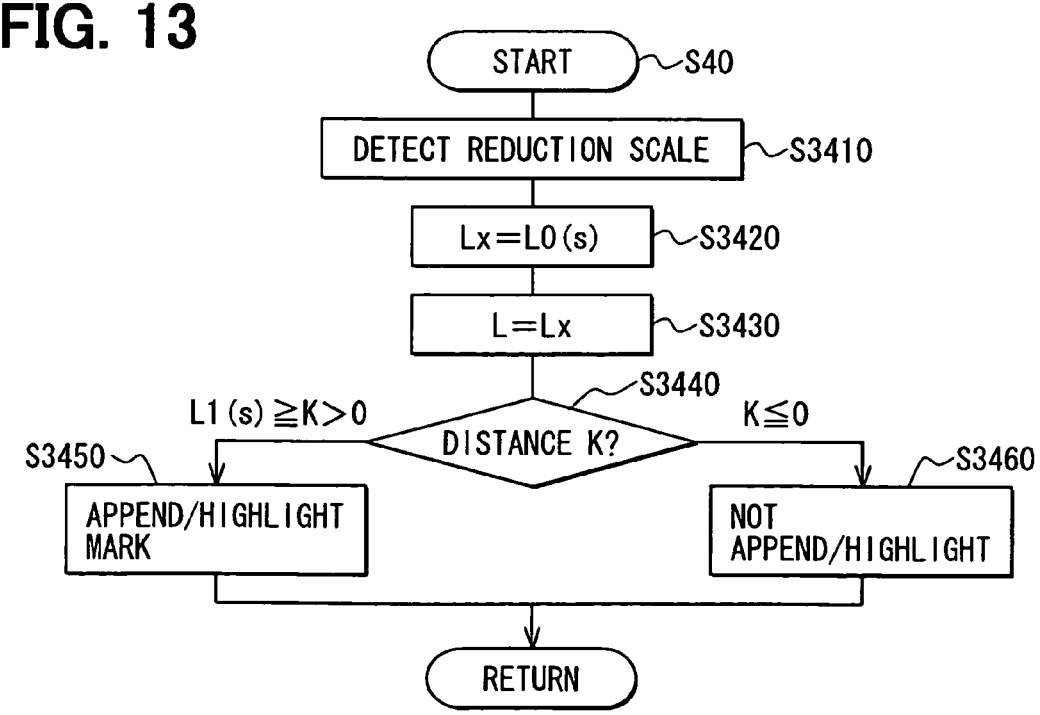
FIG. 13 is a flowchart describing length determination to be executed in order to perform length adjustment or display control in a case where the guide point is a railroad crossing.

Next, process the control unit 29 performs in a case where a guide point mark representing a railway cross is highlighted will be described with reference to the flowchart of FIG. 13. FIG. 13 describes a subroutine as an example of the process of S40 mentioned in FIG. 3.

Reference numerals employed in the flowchart of FIG. 13 will be described below. Lx and Ly denote variables, and L0(s), L1(s), and E(s) denote constants. Among them, L0(s) has been described with reference to FIG. 8. An iterative description will be omitted. Moreover, L1(s) is set to 300 m and E(s) is set to 50 m.

After the process described in FIG. 13 is initiated, a reduction scale employed in the display is detected (S3410). Control is then passed to S3420 and Lx is set to the same value as L0(s). At the next S3430, the length L is determined to indicate the same value as Lx.

While the length L of the arrow α is adjusted, control is passed to S3440 to S3460 in order to superimpose a guide point mark M4 on the arrow α and highlight K3 it. For example, at S3440, a conditional decision is made on the distance K from a current position to the nearest railway crossing. Supposing L1(s)≧K>0 is established, control is passed to S3450. As shown in FIG. 11C, the guide point mark M4 representing the railway crossing is appended to the arrow α and highlighted K2. For example, a railway passing through the railway crossing is highlighted on the display (for example, a line representing the railway is bolded, painted in a marked color, or blinked). This effectively makes the presence of the railway crossing discernible.

Supposing K≦0 is recognized as a decision made at S3440, control is passed to S3460. The guide point mark M4 is neither appended to the arrow α nor highlighted K2 (appending and highlighting are discontinued). Specifically, when the railway crossing is disposed at the arrow α, the guide point mark M4 is appended to the arrow α and highlighted K2. When the current position has passed the railway crossing, appending and highlighting are not performed any longer.

The practical meanings of the foregoing process will be described by taking for instance a case where the 100 m reduction scale is adopted and L(s) is set to 700 m. Assuming that a railway crossing is a subject of presentation (warning), the length L of the arrow α is held intact to indicate Lx=L0(s)=700 m. Even when a vehicle approaches the railway crossing and the arrowhead overpasses the railway crossing, the length L of the arrow α is not changed. When the current position approaches the railway crossing with 300 m between them, the guide point mark M4 is appended to the arrow α and highlighted K2. The display is maintained until the current position passes the railway crossing.

(Display Control for a Curve)

Figure 14:
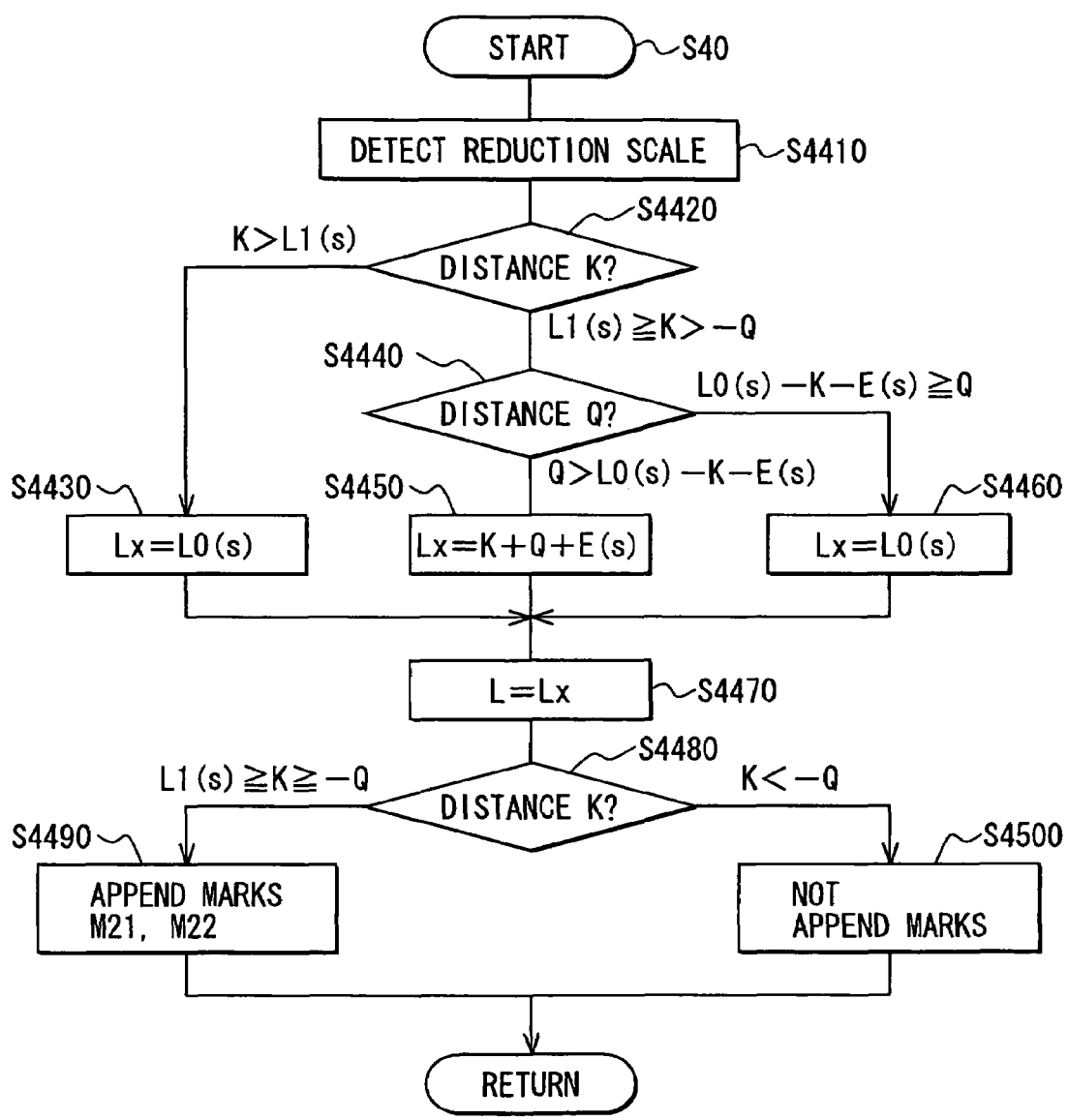
FIG. 14 is a flowchart describing length determination to be executed in order to perform length adjustment or display control in a case where the guide point is a curve.

Process the control unit 29 performs in a case where a guide point mark representing a curve is appended to an arrow and highlighted will be described with reference to the flowchart of FIG. 14. FIG. 14 describes a subroutine as an example of the process of S40 mentioned in FIG. 3.

Reference numerals employed in the flowchart of FIG. 14 will be described below. Lx and Ly denote variables, and L0(s), L1(s), and E(s) denote constants. Among them, L0(s) has been described with reference to FIG. 8. An iterative description will be omitted. Moreover, L1(s) is set to 100 m and E(s) is set to 50 m.

The constant L1(s) is set to 1000 m for a junction, 300 m for a railway crossing, and 100 m for a curve. These values are determined in consideration of a time when a warning is effectively given relative to the respective subjects of warning. Specifically, as for the junction, since giving a warning should preferably be initiated at a distance, L1(s) is set to a relatively large value of 1000 m. In contrast, as far as the railway crossing is concerned, giving a warning at a distance is little effective. Therefore, L1(s) is set to a relatively small value of 300 m. As for the curve, the length L of the arrow α is, as described below, determined so that when the initial point of the curve is displayed, the terminal point thereof can be discerned. Specifically, it is not true that the initial point of the curve is solely important, but the shape of the entire curve (whether the curve is a relatively acute curve or obtuse curve) and the length thereof have significant meanings. Therefore, the initial point and terminal point of the curve are, as described below, displayed simultaneously when a vehicle approaches the initial point of the curve with 100 m between them. Needless to say, these values are given as an example and can be determined arbitrarily.

After the process described in FIG. 14 is initiated, a reduction scale employed in the display is detected (S4410). A conditional decision is made on the distance K from the current position to the nearest intersection to be presented (S4420).

For example, supposing K>L1(s) is recognized as a decision made at S4420, control is passed to S4430 and Lx is set to the same value as L0(s). At the next S4480, the length L is determined to indicate the same value as Lx.

Supposing L1(s)≧K>−Q is recognized as a decision made at S4420, control is passed to S4440 and a conditional decision is made on the distance Q from the initial point of the curve to the terminal point thereof. Q contained in the conditional decision-making expression employed at S4420 denotes the distance Q from the initial point of the curve to the terminal point thereof on which a decision is made at S4440. Moreover, the distance K from the current position to the nearest intersection to be presented on which a decision is made at S4420 assumes a positive value when the current position is short of the initial point of the curve, and assumes a negative value when the current position has passed the initial point of the curve. Namely, as long as the initial point of the curve is located in an advancing direction, the distance K assumes the positive value.

Supposing Q>L0(s)−K−E(s) is recognized as a decision made at S4440, control is passed to S4450 and Lx is set to the same value as K+Q+E(s). On the other hand, supposing L0(s)−K−E(s)≧Q is recognized, control is passed to S4460 and Lx is set to the same value as L0(s). After S4450 or S4460 is completed, control is passed to S4480 and the length L is determined to indicate the same value as Lx.

The practical meanings of the foregoing process will be described by taking for instance a case where the 100 m reduction scale is adopted and L1(s) is set to 100 m.

Supposing the current position is separated L1(s)=100 m or more from the initial point of the nearest curve, after a decision is made at S4420, control is passed to S4430. Thereafter, the length L is held intact to indicate the same value as Lx=L0(s)=700 m.

When the current position comes to a position 100 m short of the initial point of the nearest curve, control is passed from S4420 to S4440 and a decision is made on the distance Q from the initial point of the curve to the terminal point thereof. Supposing Q denotes a value equal to or smaller than 550 m, the current position is 100 m short of the initial point of the nearest curve, and the head (arrowhead portion) of the arrow α whose length L indicates 700 m is disposed as if to 50 m or more overpass the terminal point of the curve. Therefore, the length L is held intact to indicate the same value as Lx=L0(s)=700 m at S4460. In other words, the length L of the arrow α need not be increased to indicate a value larger than 700 m.

In contrast, supposing Q denotes a value equal to or larger than 550 m (for example, 1000 m), the current position is 100 m short of the initial point of the nearest curve and the head (arrowhead portion) of the arrow α whose length L indicates 700 m is not disposed as if to 50 m or more overpass the terminal point of the curve. Supposing Q denotes 1000 m, the head of the arrow α is disposed as if to be 400 m short of the terminal point of the curve.

In this case, the length L of the arrow α is adjusted so that the arrowhead will be disposed as if to 50 m overpass the terminal point of the curve (S4450). With the arrowhead temporarily locked, the length L of the arrow α is decreased along with the shift of the current position. When the current position reaches a position 650 m beyond the terminal point of the curve, the length L of the arrow α is adjusted to indicate 700 m. Thereafter, the length L of the arrow a is held intact to indicate 700 m (S4460).

While the length L of the arrow α is adjusted, control is passed to S4480 to S4500 so that guide point marks M21 and M22 (see FIG. 11A) will be appended to the arrow α. For example, at S4480, a conditional decision is made on the distance K from the current position to the initial point of the nearest curve. Supposing L1(s)≧K≧−Q is recognized, control is passed to S4490. As shown in FIG. 11A, the guide point mark M21 representing the initial point of the curve and the guide point mark M22 representing the terminal point of the curve are appended to the arrow α.

Supposing K<−Q is recognized as a decision made at S4480, control is passed to S4500 and the guide point marks M21 and M22 are not appended to the arrow α (appending is discontinued). Specifically, when the current position approaches the initial point of the curve with 100 m between them, the guide point marks M21 and M22 are appended to the arrow α. When the current position has passed the terminal point of the curve, the guide point marks are not appended any longer.

As mentioned above, assuming that a guide point γ is a curve warning point, the length L of the arrow α is adjusted so that the arrow α will cover the entire curve from the initial point thereof to the terminal point thereof. Supposing only the initial point of a curve is regarded as the guide point and the arrow has a length permitting the arrowhead thereof to lie beyond the initial point of the curve, a warning could be given against the curve. However, a user to which the warning is given against the curve is presumably highly interested not only in the initial point of the curve but also in to where the curve is extended and where the terminal point (exit) of the curve exists. Consequently, supposing the arrow α is displayed to cover the entire curve from the initial point thereof to the terminal point thereof, the user can intuitively discern the entire curve.

(Displaying in Advance a Right or Left Turn)

The direction of a route can be checked based on the entire arrow α including the arrowhead. Since a vehicle is advancing, when the arrow α is linearly displayed, whether the vehicle should be turned right or left at a forward guide point cannot be checked. For example, even when a route including a left turn at a forward intersection is determined, supposing the intersection is not shown in a map, a user cannot check whether the user should turn to the left at the forward intersection.

Figure 15A:
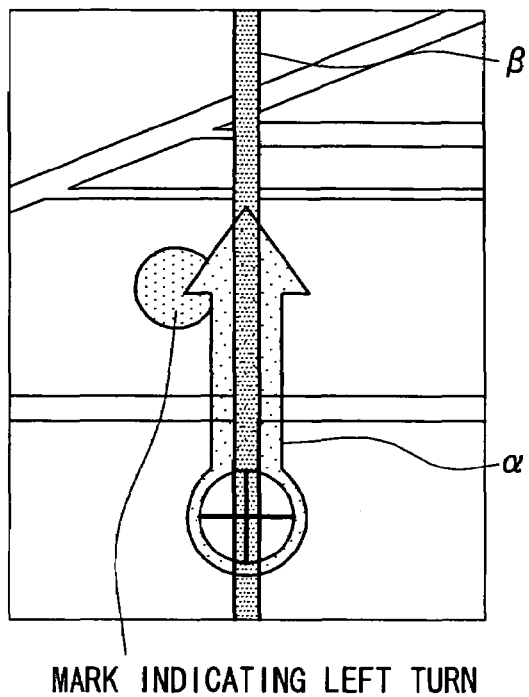
FIG. 15A and FIG. 15B are explanatory diagrams showing ideas devised for a case where a right or left turn is displayed in advance.
Figure 15B:
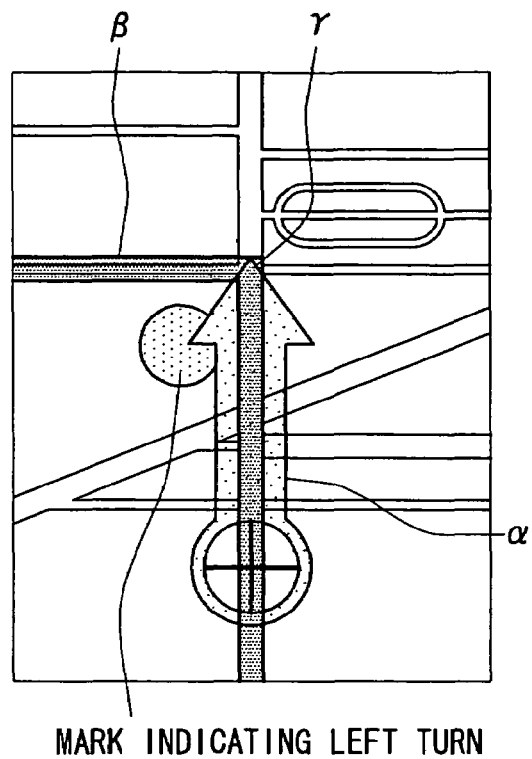

As shown in FIG. 15A and FIG. 15B, supposing an advancing direction is changed at the nearest guide point, even when the arrowhead does not reach the guide point, the arrow is displayed together with a representation of the advancing direction. In the example shown in FIG. 15A and FIG. 15B, a mark is displayed by the left side of the arrow α. The mark represents a left turn.

As shown in FIG. 15B, assuming that a route includes a left turn at a forward intersection, even when the intersection is not shown in a map (see FIG. 15A), a user can recognize the left turn at the forward intersection. Incidentally, the representation of the advancing direction may be a mark as simple as the one shown in FIG. 15A and FIG. 15B or characters "Left Turn," or "Right Turn."

Idea for displaying the arrow α so that the arrow α is oriented on the screen in a specific direction Along with driving of a vehicle, the position and advancing direction of the vehicle are changed. In particular, when the advancing direction of the vehicle is changed, display control described below is presumably extended in order to control in what direction the arrow α is oriented on the screen.

(1) Display Control shown in (a) to (d) in FIG. 16

When the arrow α is displayed linearly, or when the arrow α is displayed with the direction thereof changed at a predetermined guide point γ other than a destination on the route β, control is extended so that the advancing direction of a vehicle will be oriented in a predetermined direction on the screen all the time (see (a) to (d) in FIG. 16). Herein, the advancing direction is controlled to correspond to an upward direction on the screen. In (c), since the vehicle is being turned left at an intersection, the arrow α is oriented in a leftward direction on the screen. As shown in (d), when the vehicle has been turned left at the intersection, the advancing direction of the vehicle agrees with the direction of the arrow α. The arrow α is oriented in the upward direction on the screen.

Figure 17:
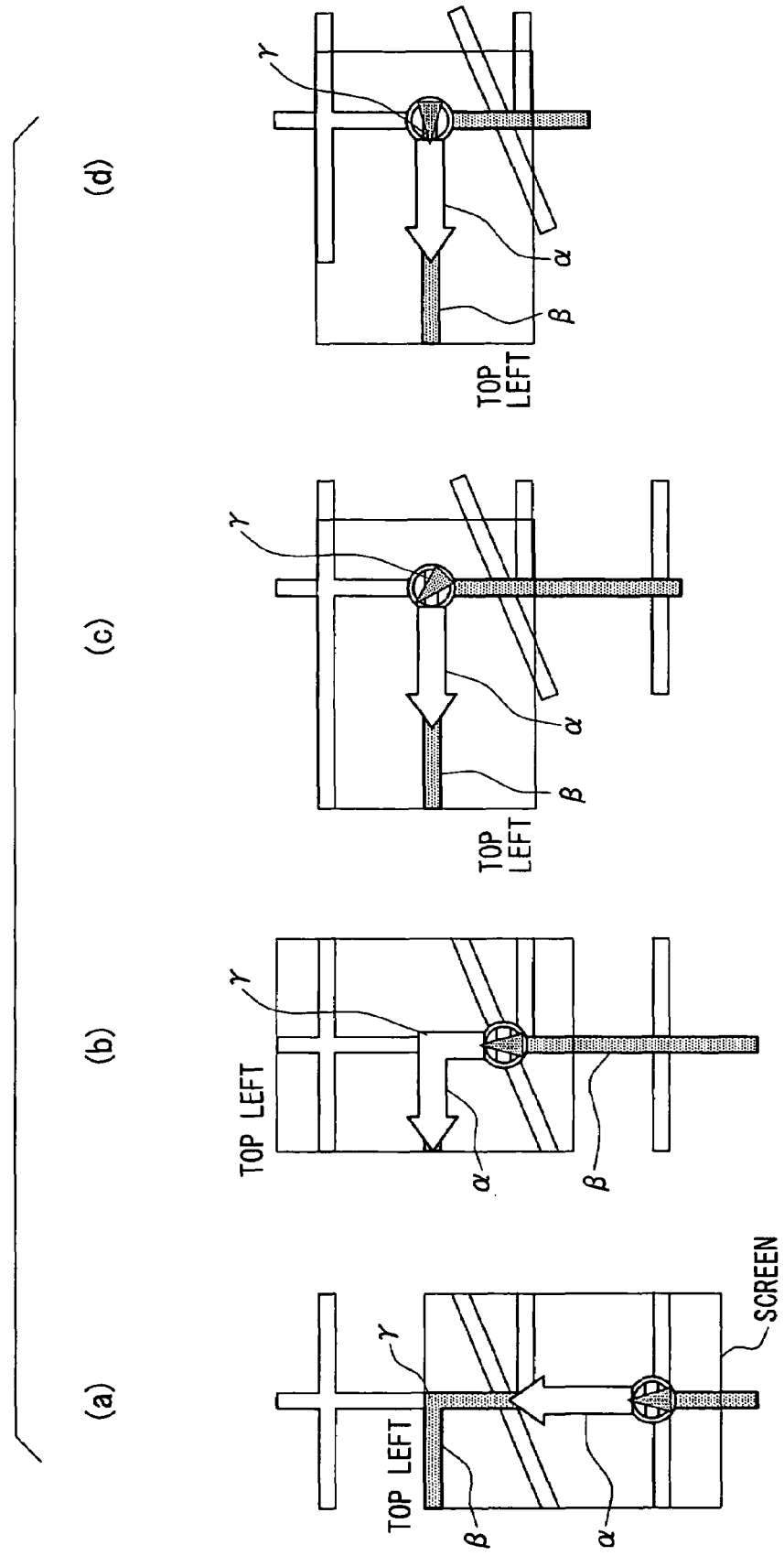
FIG. 17 includes explanatory diagrams showing in what direction on a screen the arrow α should be oriented.

(2) Display Control shown in (a) to (d) in FIG. 17

When the arrow α is displayed linearly, control is extended so that the arrowhead will be oriented in a predetermined direction (for example, an upward direction) on the screen (see (a) and (b) in FIG. 17). Assuming that the arrow α is displayed with the direction thereof changed at a predetermined guide point γ other than a destination on the route β, control is extended so that when the current position approaches the predetermined guide point γ with a predetermined distance between them, the arrowhead will be oriented in a predetermined direction on the screen (see (b) and (c) in FIG. 17).

As shown in (d) in FIG. 17, after the vehicle is turned left at the intersection, the advancing direction of the vehicle and the direction of the arrow α agree with each other. The arrow α is therefore oriented in an upward direction on the screen. However, as shown in (c), even when the vehicle is being turned left at the intersection, the arrow α disposed along the route β succeeding the left turn is controlled so that it will be oriented in the upward direction on the screen in the same manner as it is in (d). In this case, the advancing direction attained after the vehicle passes the guide point γ will correspond to the predetermined direction on the screen.

Control should be extended so that when the current position approaches a predetermined guide point γ with a predetermined distance between them, the arrowhead will be oriented in a predetermined direction on the screen. For example, in the state shown in (b) in FIG. 17, the arrow α disposed along the route β that succeeds a left turn may be controlled so that it will be oriented in the upward direction on the screen.

Figure 18:
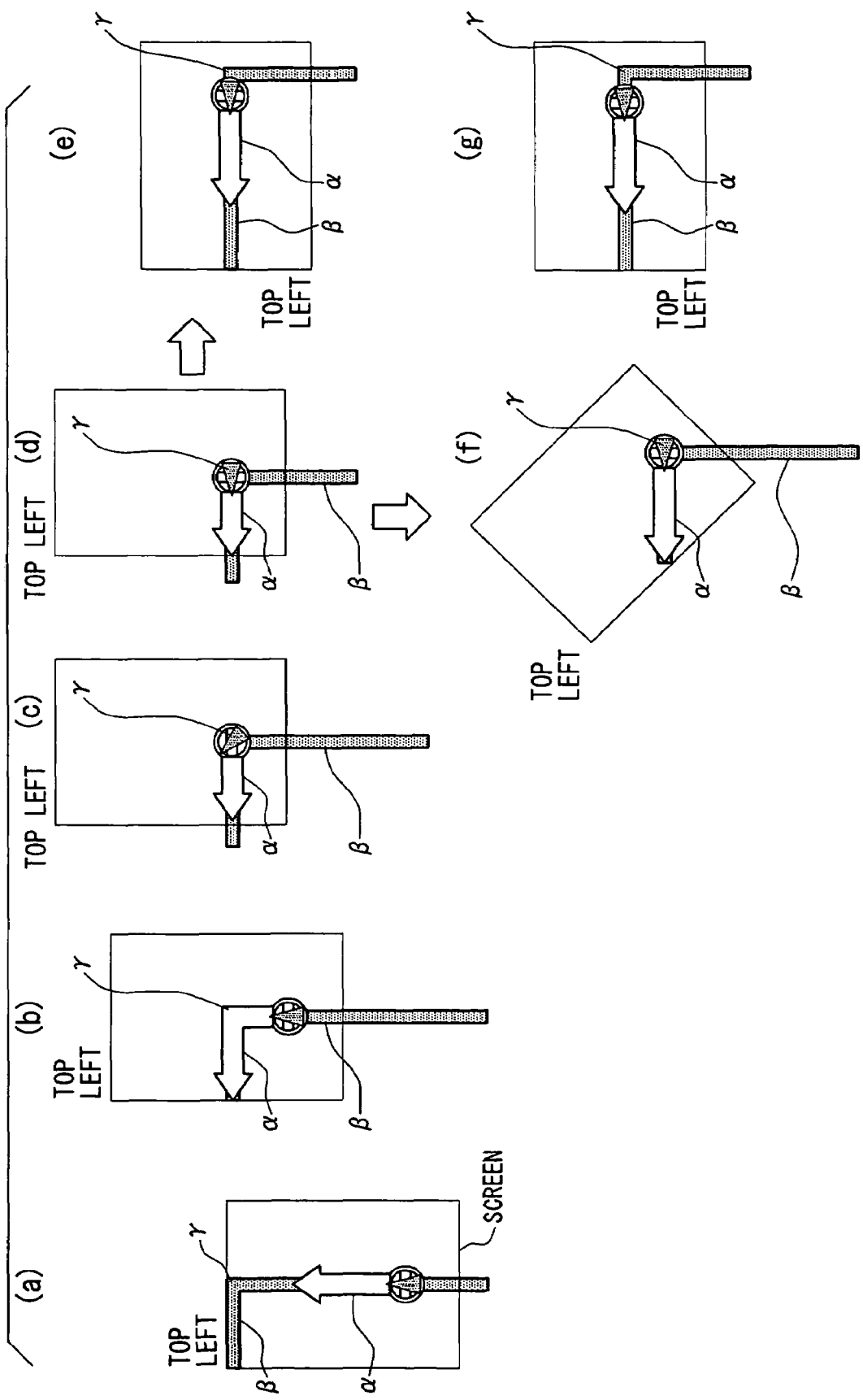
FIG. 18 includes explanatory diagrams showing in what direction on a screen the arrow α should be oriented.

(3) Display Control shown in (a) to (g) in FIG. 18

When the arrow α is linearly displayed, control is extended so that the arrowhead will be oriented in a predetermined direction (for example, the upward direction) on the screen (see (a)). Assuming that the arrow α is displayed with the direction thereof changed at a predetermined guide point γ other than a destination on the route β, control is extended so that when the current position overpasses the predetermined guide point γ by a predetermined distance, the arrowhead will be oriented in the predetermined direction on the screen (see (b) to (g)).

As shown in (d), even after the vehicle is turned left at the intersection, a direction in which the map is displayed is not changed but is the same as the one employed in the states shown in (a) to (c) in FIG. 18. As shown in (e) in FIG. 18, when the current position overpasses the predetermined guide point γ by a predetermined distance, the arrow is controlled so that the arrowhead will be oriented in a predetermined direction on the screen.

When a transition is made from the state shown in (d) to the state shown in (e), the map is turned approximately 90°. A user therefore feels that the map is turned abruptly. The state transition may therefore be made at multiple times. For example, after the state shown in (d) is changed to the state shown in (f), the state shown in (f) is changed to the state shown in (g). In this case, since the map is turned in units of approximately 45°, the impression that the map is turned abruptly can be alleviated.

(4) Display Control shown in (a) to (d) in FIG. 19

When the arrow α is linearly displayed, control is extended so that the arrowhead will be oriented in a predetermined direction (for example, an upward direction) on the screen (see (a) to (d) in FIG. 19). Assuming that the arrow α is displayed with the direction thereof changed at a predetermined guide point γ other than a destination on the route β, control is extended so that a composite vector of a unit directional vector, of which direction corresponds to an approaching direction in which the vehicle is driven to approach the predetermined guide point γ on the route β, and a unit directional vector whose direction corresponds to a receding direction in which the vehicle is driven to recede from the predetermined guide point γ will be oriented in a predetermined direction (for example, an upward direction) on the screen during a period from the instant the current position approaches the predetermined guide point γ with a predetermined distance X between them to the instant the current position overpasses the predetermined guide point γ by the predetermined distance (see (b) and (c)).

When changing the direction of the arrow α at the predetermined guide point γ other than a destination on the route β is initiated, control is extended so that the composite vector (3) of the unit directional vector (1), of which direction corresponds to an approaching direction in which the vehicle is driven to approach the predetermined guide point γ on the route β, and the unit directional vector (2) whose direction corresponds to a receding direction in which the vehicle is driven to recede from the predetermined guide point γ on the route β will be oriented in the upward direction on the screen. As shown in (d), when the current position overpasses the guide point γ by the predetermined distance, the arrow α is controlled so that it will be oriented in the predetermined direction (for example, the upward direction) on the screen.

OTHER EMBODIMENTS

Other embodiments will be described below.

(1) The length of the arrow α may be changed based on the attributes of a road included in a route. Specifically, a road type, the number of lanes, and other attributes of a road are included in map data. A relationship of correspondence between information on the attributes of each road and information on a degree of change to which the length L of the arrow α should be changed is stored in the SRAM included in the control unit 29. When the length L of the arrow α is determined, the degree of change to which the length L of the arrow α should be changed is read in association with the information on the attributes of a road on which a current position exists. The length L of the arrow a is then changed based the information on the degree of change.

For example, the relationship of correspondence signifying that the length of the arrow is increased more greatly relative to a road on which a mean velocity of vehicles is presumably higher is stored in the SRAM included in the control unit 29. For example, the length of the arrow is increased based on an estimated mean velocity of vehicles in such a manner that the length of the arrow is the largest relative to on an expressway, the length of the arrow is the second largest relative to a national highway having three or more lanes, and the length of the arrow is the third largest relative to a national highway. Incidentally, a table listing the attributes of each road in association with the length of the arrow may be preserved, or an expression that provides a percentage by which the default length of the arrow should be changed may be preserved.

Figure 20A:
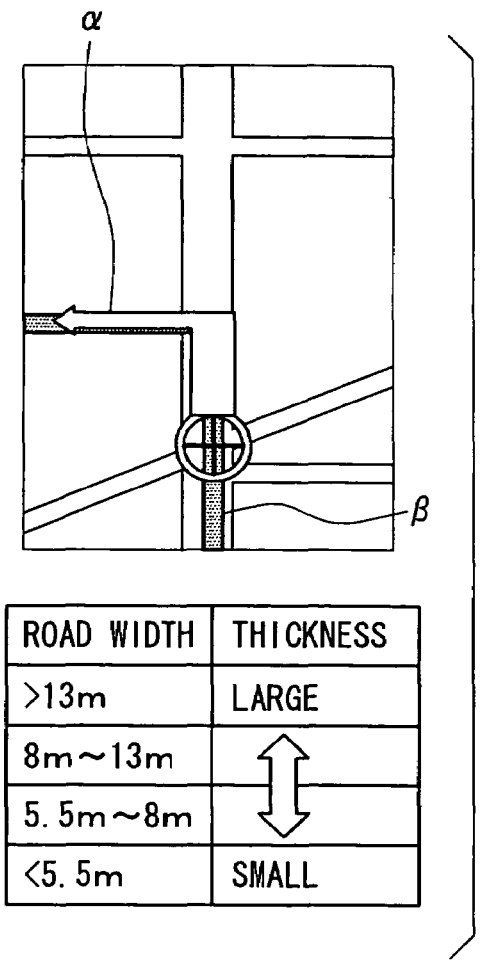
FIG. 20A and FIG. 20B are explanatory diagrams showing a case where the thickness of the arrow α is changed based on information on the attributes of a road.
Figure 20B:
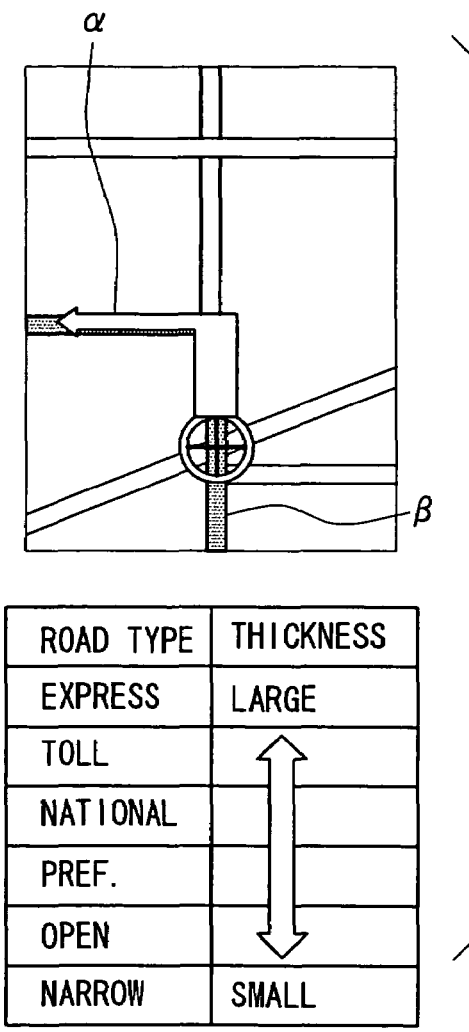

(2) The thickness of the arrow α may be changed based on the attributes of a road included in a route. Specifically, a road type, a road width, and other attributes of a road are included in map data. The relationship of correspondence between information on the attributes of each road and information on a degree of change to which the thickness of the arrow α should be changed is stored in the SRAM included in the control unit 29 (see FIG. 20A and FIG. 20B). For determination of the thickness of the arrow α, the information on the degree of change to which the thickness of the arrow α should be changed is read in association with the information on the attributes of a road on which a present position exists. The thickness of the arrow α is adjusted based on the degree of change.

For example, the relationship of correspondence signifying that the thickness of the arrow α is increased more greatly relative to a road whose width is larger or a road whose width is estimated to be larger should be stored in the SRAM included in the control unit 29. Supposing information on a width is stored, a relationship of correspondence signifying that the arrow α is thickened more greatly relative to a larger width should be recorded (see FIG. 20A). Moreover, supposing information on a road type is stored, the thickness of the arrow α may be the largest relative to an expressway, the second largest relative to a national highway having thee or more lanes, and the third largest relative to a national highway (see FIG. 20B). Similarly to the case of the length L of the arrow, a table describing the correspondence of the attributes of each road with the thickness of the arrow α may be preserved, or an expression that provides a percentage by which the default thickness of the arrow α should be changed may be preserved.

(3) In the aforesaid embodiment, the arrow α is, as shown in FIG. 2, displayed in a half transparent form. This idea is made in order that when the arrow α is superimposed on a map image and the route β, the map image and route will be discernible. As long as this advantage is given, any other technique may be adopted. For example, the arrow α may be expressed with a dashed line.

(4) Even when a mark representing a guide point γ is superimposed on the arrow α, the route β on which the guide point γ represented by the mark exists should preferably be discernible. The transparency of the mark representing the guide point γ may be able to be adjusted so that at least the route β can be discerned through the mark. In this way, the predetermined mark and arrow α should be displayed.

Figure 21A:
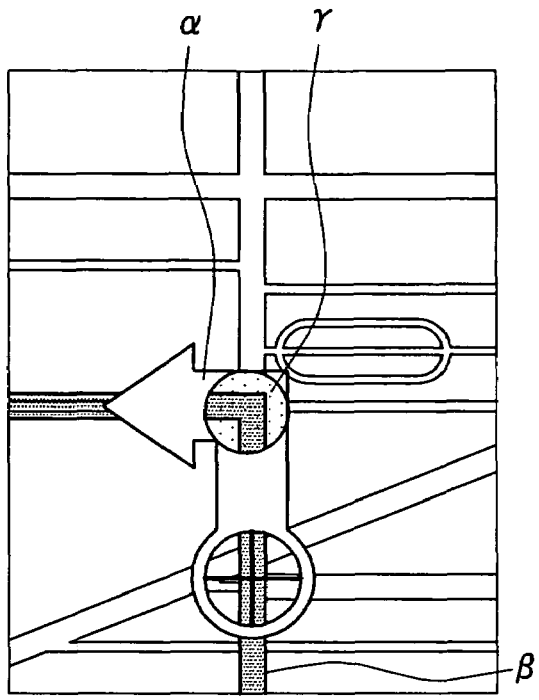
FIG. 21A and FIG. 21B are explanatory diagrams showing a case where a mark representing a guide point γ is displayed in a transparent form.
Figure 21B:
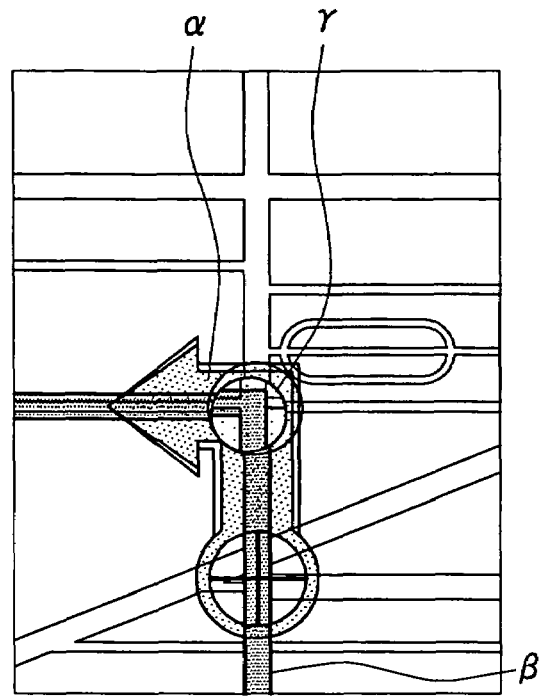

For example, in the example shown in FIG. 21A, the arrow α is not transparent as a whole. A mark representing a guide point γ has the transparency thereof adjusted so that the route β can be discerned. Moreover, in the example shown in FIG. 21B, the arrow α is transparent as a whole, and the mark representing the guide point γ has the transparency thereof adjusted so that the route β can be discerned.

(5) In the example shown in FIG. 2, the map is scrolled along with advancement of a vehicle, but the position of the vehicle (own vehicle position) on the screen is left unchanged.

Figure 22:
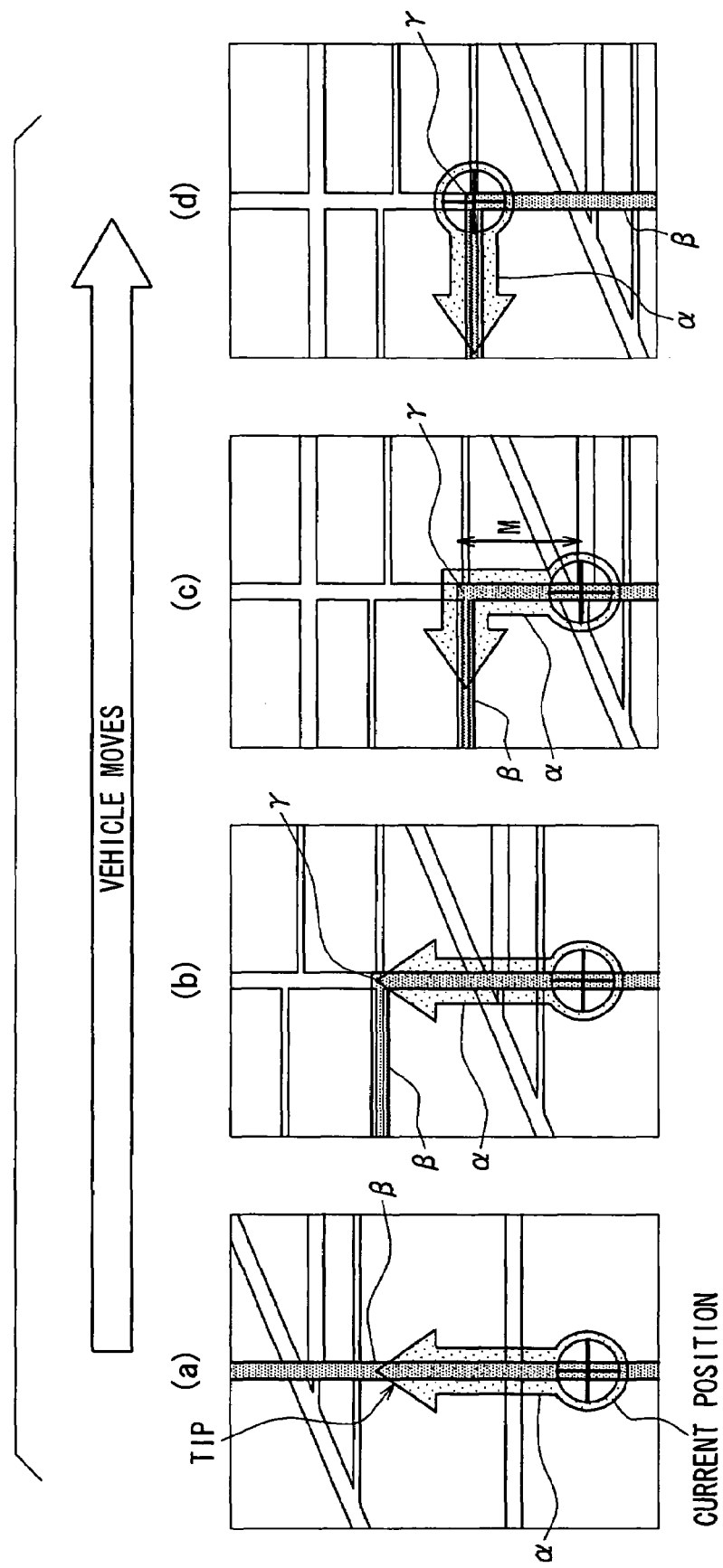
FIG. 22 includes explanatory diagrams concerning a case where when an own vehicle position approaches the guide point γ with a predetermined distance M between them, the guide point γ is locked.

However, as shown in (a) to (d) in FIG. 22, when the own vehicle position approaches a guide point γ with a predetermined distance M between them, the position of the guide point γ may be left unchanged and the own vehicle position may be shifted. Specifically, in (a) to (c), the own vehicle position is left unchanged. When the state shown in (c) is attained, the position of the guide point γ is left unchanged and the own vehicle position is shifted to the upper part of the screen. As shown in (d), when the own vehicle position reaches the guide point γ and passes the guide point γ, the own vehicle position is returned to the one shown in (a) (the lower part of the screen). In this case, the own vehicle position may be returned to the original one at a time or may be returned thereto step by step.

Figure 23:
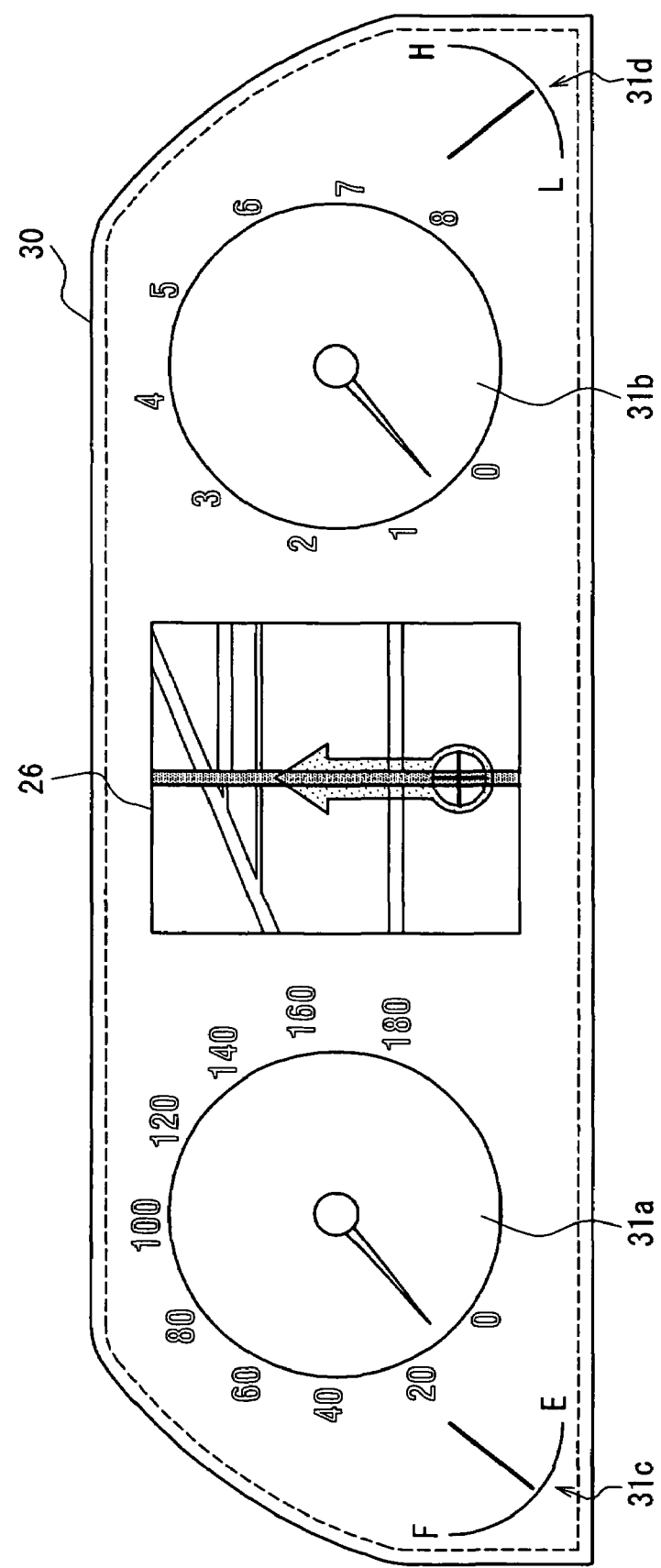
FIG. 23 is a conceptual diagram showing a liquid crystal display interposed between mechanical indicators.

Furthermore, as shown in FIG. 23, the display 26 may be interposed between at least two indicators 31a to 31d (which may be mechanical) that display different indications, in an instrument panel 30.

Furthermore, a program to be installed in the navigation system may be run by a computer incorporated in the navigation system. In this case, for example, the program is stored in a recording medium that is readable by the computer, for example, a flexible disk, a magneto-optical disk, a CD-ROM, a hard disk, a ROM, or a RAM. The program is loaded into the computer and run whenever it is needed, whereby the computer acts as the control unit included in the navigation system. Moreover, since the program may be distributed over a network, the navigation system can be readily upgraded.

It will be obvious to those skilled in the art that various changes may be made in the above-described embodiments of the present invention. However, the scope of the present invention should be determined by the following claims.

What is claimed is:

1. A navigation system comprising:
  a guide unit including a display on which at least an image is displayed;
  a map data acquisition unit that acquires map data;
  a current position identification unit that identifies a current position of a vehicle;

a route obtaining unit that obtains a route to a destination; and a guide control unit that uses the map data acquired by the map data acquisition unit to display on the display a map image which shows the current position identified by the current position identification unit and its surroundings, and that displays the route, which is recognized by the route obtaining unit, while superimposing the route on the map image, wherein the guide control unit displays an arrow, which includes
a base that indicates the current position identified by the current position identification unit,
an arrowhead that points out a forward position separated by a predetermined distance along the route, and
a segment leading to the arrowhead, while superimposing the arrow on the map image on which the route is superimposed, the arrowhead of the arrow being moved synchronously with a shift of the current position.

2. The navigation system according to claim 1, wherein when the guide control unit superimposes the arrow on the map image on which the route is superimposed,
the guide control unit displays the arrow so that the map image and route are discernible.

3. The navigation system according to claim 1, wherein the guide control unit
is able to display on the display a map image produced in a different reduction scale,
determines a distance from the base of the arrow to the arrowhead thereof, based on the reduction scale employed in the map image displayed, and
displays the arrow indicating the determined distance.

4. The navigation system according to claim 1, wherein:
the guide unit includes a loudspeaker via which sounds are outputted; and
when the current position identified by the current position identification unit approaches a position that is separated by a predetermined audio guide distance from a predetermined audio guide point on the route,
the guide control unit
gives predetermined audio guide via the loudspeaker,
determines the distance between the base of the arrow and the arrowhead thereof, based on the audio guide distance, and
displays the arrow indicating the determined distance.

5. The navigation system according to claim 4, wherein when the current position approaches a position that is separated by the predetermined audio guide distance from that audio guide point,
the guide control unit
gives the predetermined audio guide via the loudspeaker,
determines the distance between the base of the arrow and the arrowhead thereof, based on the audio guide distance,
displays the arrow indicating the determined distance, and
also displays the arrow in a modified form.

6. The navigation system according to claim 1, wherein the guide control unit displays the arrow by varying color or shape of a portion of the arrow between the base of the arrow and the arrowhead thereof, or by graduating the portion of the arrow between the base of the arrow and the arrowhead thereof.

7. The navigation system according to claim 6, wherein: only when the arrowhead reaches a predetermined guide point other than a destination on the route, the guide control unit
varies at predetermined intervals the color or shape of the portion of the arrow between the base of the row and the arrowhead thereof, or
graduates at predetermined intervals the portion of the arrow between the base of the arrow and the arrowhead thereof, and then
displays the arrow; and when the base of the arrow passes the predetermined guide point other than the destination,
the guide control unit
cancels the varying of the color or shape or cancels the graduating at predetermined intervals, and then
displays the arrow.

8. The navigation system according to claim 1, wherein:
when the arrowhead reaches a predetermined guide point other than a destination on the route,
the guide control unit
adjusts a length of the arrow so that the arrowhead overpasses the guide point and
displays the arrow; and
when the arrowhead reaches the destination on the route,
the guide control unit
adjusts the length of the arrow so that the arrowhead is locked at the destination and
displays the arrow.

9. The navigation system according to claim 8, wherein:
when the arrowhead reaches a predetermined guide point other than a destination on the route,
the guide control unit decides whether a distance from the guide point, regarded as a reference, to a nearest guide point falls below a predetermined distance;
supposing that the distance falls below the predetermined distance, the guide control unit adjusts the length of the arrow so that the arrowhead overpasses the guide point;
assuming that forward guide points are handled in an identical manner, the guide control unit orderly decides whether a distance between adjoining guide points satisfies a condition that the distance between adjoining guide points falls below the predetermined distance; and
supposing that the condition is satisfied continuously, the guide control unit adjusts the length of the arrow so that the arrowhead overpasses the respective guide points concerned.

10. The navigation system according to claim 1, wherein:
when a predetermined guide point other than a destination on the route is displayed on a display screen of the display, the guide control unit adjusts a length of the arrow so that the arrowhead overpasses the guide point; and
when the destination on the route is displayed on the display screen of the display, the guide control unit adjusts the length of the arrow so that the arrowhead is locked at the destination.

11. The navigation system according to claim 10, wherein when the predetermined guide point is a point of warning for a curve, the guide control unit adjusts the length of the arrow so that the arrow covers a whole of the curve from an initial point of the curve to a terminal point thereof.

12. The navigation system according to claim 1, wherein when the arrow exists at a predetermined guide point on the route, the guide control unit superimposes a predetermined mark, which represents the guide point, on the arrow.

13. The navigation system according to claim 12, wherein the guide control unit adjusts transparency of the predetermined mark, which represents the guide point, so that the route is discernible through at least part of the predetermined mark, and superimposes the predetermined mark and arrow on the route.

14. The navigation system according to claim 13, wherein:
when the predetermined guide point is a junction, the guide control unit highlights a joining road; and
when, the predetermined guide point is a railway crossing, the guide control unit highlights the railway crossing.

15. The navigation system according to claim 1, wherein the map data acquired by the map data acquisition unit includes information on attributes of a road such as a road type and a number of lanes,
further comprising
a relationship-of-correspondence memory unit in which a relationship of correspondence between information on the attributes of each road and information on a degree of change to which a length of the arrow should be changed is stored, wherein
the guide control unit
reads the information on a degree of change, to which the length of the arrow should be changed, from the relationship-of-correspondence memory unit in association with the information on the attributes of a road on which the current position identified by the current position identification unit exists,
adjusts the length of the arrow based on the information on the degree of change to which the length of the arrow should be changed, and
displays the arrow.

16. The navigation system according to claim 1, wherein when an attempt is made to display the row having a predetermined length or the arrow whose length is adjusted in a predetermined manner, supposing the arrowhead comes out of a display screen of the display, the guide control unit adjusts the length of the arrow to confine the arrowhead within the display screen, and displays the arrow.

17. The navigation system according to claim 1, wherein assuming that an advancing direction is changed at a nearest guide point among all predetermined guide points other than a destination on the route, when the arrowhead does not reach the guide point, the guide control unit displays the arrow together with a representation of the advancing direction.

18. The navigation system according to claim 1, wherein when the arrow is linearly displayed or when the arrow is displayed with a direction thereof changed at a predetermined guide point other than a destination on the route, the guide control unit extends control so that the advancing direction of the vehicle corresponds to a predetermined direction on a screen.

19. The navigation system according to claim 1, wherein:
when the arrow is linearly displayed, the guide control unit extends control so that the arrowhead is oriented in a predetermined direction on a screen; and
when the arrow is displayed with a direction thereof changed at a predetermined guide point other than a destination on the route,
the guide control unit extends control so that when the current position approaches the predetermined guide point with a predetermined distance between them, the arrowhead is oriented in the predetermined direction on the screen.

20. The navigation system according to claim 1, wherein:
when the arrow is linearly displayed, the guide control unit extends control so that the arrowhead is oriented in a predetermined direction on a screen; and
when the arrow is displayed with the direction thereof changed at a predetermined guide point other than a destination on the route,
the guide control unit extends control so that when the current position overpasses the predetermined guide point by a predetermined distance, the arrowhead is oriented in the predetermined direction on the screen.

21. The navigation system according to claim 1, wherein:
when the arrow is linearly displayed, the guide control unit extends control so that the arrowhead is oriented in a predetermined direction on a screen; and
when the arrow is displayed with a direction thereof changed at a predetermined guide point other than a destination on the route,
the guide control unit extends control so that a composite vector of a unit directional vector, of which direction corresponds to an approaching direction in which the vehicle is driven to approach the predetermined guide point on the route, and a unit directional vector, of which direction corresponds to a receding direction in which the vehicle is driven to recede from the predetermined guide point on the route, is oriented in the predetermined direction on the screen during a period from when the current position approaches the predetermined guide point with a predetermined distance between them to when the current position overpasses the predetermined guide point by the predetermined distance.

22. The navigation system according to claim 1, wherein the display included in the guide unit is interposed between at least two indicators that display mutually different indications.

23. A computer readable medium comprising instructions being executed by a computer, the instructions including a computer-implemented method for controlling the guide control unit in the navigation system according to claim 1, the instructions including:
using the map data acquired by the map data acquisition unit to display on the display a map image which shows the current position identified by the current position identification unit and its surroundings, and
displaying the route, which is recognized by the route obtaining unit, while superimposing the route on the map image, wherein an arrow is displayed, which includes
a base that indicates the current position identified by the current position identification unit,
an arrowhead that points out a forward position separated by a predetermined distance along the route, and
a segment leading to the arrowhead, while superimposing the arrow on the map image on which the route is superimposed.

* * * * *